United States Patent
Hakoi et al.

(10) Patent No.: US 9,217,897 B2
(45) Date of Patent: *Dec. 22, 2015

(54) LIQUID CRYSTAL DISPLAY DEVICE AND METHOD FOR MANUFACTURING LIQUID CRYSTAL DISPLAY DEVICE

(75) Inventors: Hiroyuki Hakoi, Osaka (JP); Masanobu Mizusaki, Osaka (JP); Koichi Miyachi, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 88 days.

This patent is subject to a terminal disclaimer.

(21) Appl. No.: 14/232,010

(22) PCT Filed: Jul. 6, 2012

(86) PCT No.: PCT/JP2012/067264
§ 371 (c)(1),
(2), (4) Date: Jan. 10, 2014

(87) PCT Pub. No.: WO2013/008727
PCT Pub. Date: Jan. 17, 2013

(65) Prior Publication Data
US 2014/0176888 A1 Jun. 26, 2014

(30) Foreign Application Priority Data
Jul. 14, 2011 (JP) .................. 2011-156048

(51) Int. Cl.
*C09K 19/02* (2006.01)
*G02F 1/1337* (2006.01)

(52) U.S. Cl.
CPC .... *G02F 1/133711* (2013.01); *G02F 1/133788* (2013.01); *G02F 2001/133715* (2013.01)

(58) Field of Classification Search
CPC .................. G02F 1/133711; G02F 1/133788; G02F 2001/133788; C09K 19/02
USPC ............. 349/106, 123, 182, 183; 428/1.1, 1.2
See application file for complete search history.

(56) References Cited

U.S. PATENT DOCUMENTS

| 2005/0116200 | A1 | 6/2005 | Nakanishi et al. |
| 2005/0185131 | A1 | 8/2005 | Miyachi et al. |
| 2012/0008079 | A1 | 1/2012 | Mizusaki et al. |
| 2012/0092603 | A1 | 4/2012 | Mizusaki et al. |
| 2015/0015826 | A1* | 1/2015 | Mizusaki ............. 349/61 |
| 2015/0085236 | A1* | 3/2015 | Kanehiro et al. ......... 349/124 |

FOREIGN PATENT DOCUMENTS

| JP | 06-347795 A | 12/1994 |
| JP | 2003-307720 A | 10/2003 |
| JP | 2006-099039 A | 4/2006 |
| WO | 2010/116551 A1 | 10/2010 |
| WO | 2011/001579 A1 | 1/2011 |

OTHER PUBLICATIONS

Official Communication issued in International Patent Application No. PCT/JP2012/067264, mailed on Jul. 31, 2012.
Kanehiro et al.; "Liquid Crystal Display Device and Method for Manufacturing Liquid Crystal Display Device"; U.S. Appl. No. 14/382,853, filed Sep. 4, 2014.
Mizusaki; "Liquid Crystal Display Device and Method for Manufacturing Same"; U.S. Appl. No. 14/370,296, filed Jul. 2, 2014.

* cited by examiner

*Primary Examiner* — Geraldina Visconti
(74) *Attorney, Agent, or Firm* — Keating & Bennett, LLP

(57) ABSTRACT

The present invention provides a liquid crystal display device which enables to reduce the occurrence of image sticking without deteriorating the electric properties, and a method for manufacturing a liquid crystal display device which enables to reduce the occurrence of image sticking. The liquid crystal display device of the present invention includes a pair of substrates, a liquid crystal layer disposed between the pair of substrates, an alignment film formed on at least one of the pair of substrates, and a polymer layer formed on the alignment film and controlling the alignment of liquid crystal molecules which are adjacent to the polymer layer, wherein the polymer layer is formed by polymerization of one or more kinds of monomers added in the liquid crystal layer, and at least one of the one or more kinds of monomers is a monomer polymerizable upon exposure to visible light.

11 Claims, 7 Drawing Sheets

LIQUID CRYSTAL DISPLAY DEVICE AND METHOD FOR MANUFACTURING LIQUID CRYSTAL DISPLAY DEVICE

TECHNICAL FIELD

The present invention relates to a liquid crystal display device, and a method for manufacturing a liquid crystal display device. More specifically, the present invention relates to a liquid crystal display device in which a polymer layer for enhancing the alignment-control capability of a liquid crystal is formed on an alignment film, and a method for manufacturing a liquid crystal display device suitable for forming a polymer layer on an alignment film.

BACKGROUND ART

Liquid crystal display (LCD) devices are display devices which control transmission/blocking of light (on/off of image display) by controlling the alignment of liquid crystal molecules having birefringence properties. For alignment of liquid crystal molecules, for example, an alignment film with aligning ability is formed on a face to contact to a liquid crystal layer of a substrate. The aligning ability is provided by alignment treatment such as rubbing method or photo-alignment method.

Another example of the method for controlling the alignment of liquid crystal molecules is multi-domain vertical alignment (MVA) mode, in which the alignment of liquid crystal molecules is controlled by structures for alignment control, such as dielectric protrusions provided on an electrode or slits in an electrode, without performing an alignment treatment. In MVA mode, the structure for alignment control enables to align liquid crystals in a plurality of different directions while a voltage is applied to the liquid crystals, even without rubbing treatment on an alignment film. Thus, MVA mode achieves better viewing angle characteristic than conventional TN mode.

However, the regions with protrusions or slits are likely to have low light transmittance. The regions are allowed to have higher light transmittance by simplifying the arrangement and increasing the distances between the protrusions or the spaces between the slits. When the distances between the protrusions or the spaces between the slits are too large, however, the propagation of the tilting of liquid crystal molecules takes a longtime. Thus, the liquid crystal molecules respond very slowly to application of a voltage necessary for image display to the liquid crystal layer.

In order to increase the response rate, studies have been made on a technology of forming, on an alignment film, a polymer layer on which the tilt direction of liquid crystal molecules is recorded (hereinafter also referred to as polymer sustained alignment (PSA) technology). The tilt direction is recorded by injecting a liquid crystal composition containing a polymerizable monomer between substrates, followed by polymerization of the monomer under voltage application (see, for example, Patent Literature 1).

Moreover, vertical alignment-twisted nematic (VA-TN) mode using a photo-alignment film is known as an effective method to improve both the light transmittance and the response rate. The photo-alignment film is an alignment film which exhibits an alignment-control capability for controlling the alignment of liquid crystal molecules in its entire region exposed to light. Thus, unlike MVA mode, formation of protrusions or slits for controlling the alignment of liquid crystal molecules is not necessary, which leads to an improvement in the light transmittance. Since the alignment film has the alignment-control capability over its entire region, all liquid crystal molecules facing the alignment film are concurrently aligned, unlike MVA mode which allows liquid crystal molecules to align in a domino-like manner. Thus, the response rate is increased.

Furthermore, application of twisted-nematic (TN) mode, specifically a technique to provide a plurality of domains having different alignment directions from one another in a region corresponding to one pixel in the liquid crystal layer, enables to achieve excellent viewing angle characteristic at the same time. The number of the domains is preferably 4, which enables to achieve well-balanced viewing angle characteristic.

However, in the case of a liquid crystal mode using a conventional PSA technology or a photo-alignment film, image sticking sometimes occurs in a liquid crystal display. Image sticking is a phenomenon where, when an image is displayed for a long time and the image is changed with a different image, the previously displayed image remains visible on the screen.

The inventors of the present application have found out that one of the causes of image sticking is a phenomenon (hereinafter, also referred to as $\Delta$tilt) where the tilt of liquid crystal molecules is not fully returned after continuous application of a voltage to the liquid crystal molecules, or in other words, changes occur in the tilt angle from that in the initial state. FIG. 13 and FIG. 14 show conceptual images illustrating the principle of image sticking caused by insufficient returning of the tilt of liquid crystal molecules. FIG. 13 illustrates the state where a voltage is applied, whereas FIG. 14 illustrates the state when the voltage is changed to a voltage for halftone display after application of a voltage for a certain period of time. Meanwhile, in the examples explained above, liquid crystal molecules having a negative dielectric constant anisotropy are used.

As shown in FIG. 13, a liquid crystal display panel typically includes a pair of substrates 111 and 112 each having a polarizing plate applied thereto, and a liquid crystal layer 113 disposed between the pair of substrates 111 and 112. The liquid crystal layer 113 contains a plurality of liquid crystal molecules 151 which align differently depending on the level of voltages applied inside the liquid crystal layer 113. In the example shown in FIG. 13, regions in both ends are regions of black display where no voltage is applied. In this state, the liquid crystal molecules 151 align in a substantially perpendicular direction to the surfaces of the substrates 111 and 112. Thus, light having passed through one of the polarizing plates penetrates the liquid crystal layer 113, and is then blocked by the other polarizing plate. A region in the middle is a region of white display where a threshold or higher voltage is applied. In this state, the liquid crystal molecules 151 tilt in a substantially horizontal direction to the surfaces of the substrates 111 and 112. Thus, light having passed through one of the polarizing plates penetrates the liquid crystal layer, and then further passes through the other polarizing plate to exit as display light.

In contrast, when the voltage is changed to a voltage for halftone display as shown in FIG. 14, the liquid crystal molecules 151 in the regions of black display tilt diagonally to the surfaces of the substrates 111 and 112 to provide a desired halftone display. However, the liquid crystal molecules 151 in the region of long-time white display may not fully return to the desired diagonal tilt direction to the surfaces of the substrates. As a result, images in the region are displayed brighter (occurrence of image sticking) than those in other halftone display regions.

In order to prevent the Δtilt of liquid crystal molecules in a liquid crystal mode using a photo-alignment film, studies have been made on a technology of forming, on an alignment film, a polymer layer on which the tilt direction of liquid crystal molecules is recorded. The polymer layer is formed by injecting a liquid crystal composition containing a polymerizable monomer between a pair of substrates, at least one of the pair of substrates being provided with a photo-alignment film, followed by polymerization of the monomer without voltage application (see, for example, Patent Literature 2).

CITATION LIST

Patent Literature

Patent Literature 1: JP 2003-307720 A
Patent Literature 2: WO 2010-116551

SUMMARY OF INVENTION

Technical Problem

However, the monomers used in the PSA polymerization step in the above technology have an absorption wavelength of 340 nm or shorter. For polymerization of the monomers, the liquid crystal layer needs to be continuously exposed to ultraviolet rays having a strong energy, such as black light. Such long-time exposure may degrade or damage the components of the liquid crystal display panel, such as a liquid crystal layer and an alignment film, and thus may highly likely deteriorate the electric properties of those components.

The present invention has been made in consideration of the above current situation, and aims to provide a liquid crystal display device which enables to reduce the occurrence of image sticking without deteriorating the electric properties, and a method for manufacturing a liquid crystal display device which enables to reduce the occurrence of image sticking.

Solution to Problem

As a result of intensive studies, the present inventors have found that use of monomers which are polymerizable upon exposure to visible light enables to form a polymer layer for PSA without exposure to ultraviolet rays, and that the use enables to reduce damages to a liquid crystal layer, an alignment film, or the like, so that changes in the electric properties can be reduced. Visible light is light having a wavelength of 360 to 830 nm according to the definition of the optical terms in Japanese Industrial Standards Committee (JIS Z 8120). The inventors also have found that, when voltage application is stopped after application of a voltage for a certain period of time, the Δtilt of liquid crystal molecules is reduced in the case where visible light is used for a PSA polymerization step. Reduction in the Δtilt means that the tilt of the liquid crystal molecules almost fully returns to the initial tilt when a voltage is applied for a certain period of time and then the voltage is changed to the initial voltage, thus greatly contributing to the reduction of the occurrence of image sticking.

Furthermore, if the PSA polymerization step is performed by exposure to visible light, the step can be performed by using a backlight which is a typical display light source mounted on a liquid crystal display device. Thus, no additional equipment investment is necessary, greatly contributing to the reduction of the manufacturing cost. Accordingly, the present inventors successfully solved the aforementioned problems, and thereby they completed the present invention.

That is, one aspect of the present invention is a liquid crystal display device (hereinafter, also referred to as the first liquid crystal display device of the present invention), including a pair of substrates, a liquid crystal layer disposed between the pair of substrates, an alignment film formed on at least one of the pair of substrates, and a polymer layer formed on the alignment film and controlling the alignment of liquid crystal molecules which are adjacent to the polymer layer, wherein the polymer layer is formed by polymerization of one or more kinds of monomers added in the liquid crystal layer, and at least one of the one or more kinds of monomers is a monomer polymerizable upon exposure to visible light.

One of the pair of substrates is used as a thin film transistor (TFT) substrate and the other is used as a counter substrate in the liquid crystal display device of the present invention, for example. Disposing a plurality of pixel electrodes on the thin film transistor substrate enables to control the alignment of liquid crystal crystals in each pixel. Moreover, disposing color filters of a plurality of colors on the counter substrate at positions overlapping the pixel electrodes enables to control the colors to be displayed in each pixel. The color filters may be formed not on the counter substrate side but on the thin film transistor substrate side.

An alignment film is formed on at least one of the pair of substrates. In the present invention, the alignment film may be one that has undergone an alignment treatment or one that has not undergone an alignment treatment. Examples of the alignment treatment to be provided to an alignment film include rubbing treatment and photo-alignment treatment.

The liquid crystal display device of the present invention includes a polymer layer for controlling the alignment of liquid crystal molecules which are adjacent to the polymer layer. The polymer layer is formed on the alignment film. The polymer layer is formed by polymerization of one or more kinds of monomers added in the liquid crystal layer. Due to the polymer layer formed, even if the alignment film has not undergone an alignment treatment, the liquid crystal molecules adjacent to the alignment film and the polymer layer are allowed to initially tilt in a certain direction. Moreover, the alignment film having undergone an alignment treatment is allowed to have stable alignment-control capability.

At least one of the one or more kinds of monomers is a monomer polymerizable upon exposure to visible light. The use of a monomer polymerizable upon exposure to visible light prevents damages to components such as a liquid crystal layer and an alignment film, and thus enables to avoid deterioration of the electric properties of the liquid crystal display device.

Another aspect of the present invention is a liquid crystal display device (hereinafter, also referred to as the second liquid crystal display device of the present invention), including a pair of substrates, a liquid crystal layer disposed between the pair of substrates, an alignment film formed on at least one of the pair of substrates, and a polymer layer formed on the alignment film and controlling the alignment of liquid crystal molecules which are adjacent to the polymer layer, wherein the polymer layer is formed by polymerization of one or more kinds of monomers added in the liquid crystal layer, the polymerization being initiated by one or more kinds of polymerization initiators added in the liquid crystal layer, and at least one of the one or more kinds of polymerization initiators causes a chemical reaction upon exposure to visible light to polymerize at least one of the one or more kinds of monomers.

The configuration of the second liquid crystal display device of the present invention also prevents damages to components such as a liquid crystal layer and an alignment film. Thus, the configuration achieves the same effect as the configuration in which a monomer polymerizable upon exposure to visible light is used. However, a polymerization initiator may remain in the liquid crystal layer after polymerization of the monomer. In view of this, the configuration of the first liquid crystal display device of the present invention is more preferable for further enhancement of the electric property of the liquid crystal display device.

The configuration of each liquid crystal display device of the present invention is not especially limited by other components as long as it essentially includes such components.

Preferable examples of the configuration of each liquid crystal display device include the following embodiments.

The one or more kinds of monomers preferably include two or more kinds of monomers, and the monomer polymerizable upon exposure to visible light is preferably a monomer (hereinafter, also referred to as a monomer having an initiator function) capable of polymerizing the other kinds of monomers. The monomer having an initiator function refers to a monomer that causes a chemical reaction upon exposure to visible light so that it not only initiates or enhances the polymerization of other monomers which are not polymerizable by themselves upon exposure to visible light, but also polymerizes itself. The use of the monomer having an initiator function enables the use of many currently available monomers which are not polymerizable by visible light as materials for a polymer layer. Thus, such a monomer is very useful for obtaining desired alignment films and polymer layers. Examples of the monomer having an initiator function include monomers including structures which may generate radicals upon exposure to visible light.

The alignment film is preferably an alignment film provided with an alignment control function by a photo-alignment treatment. This enables to change the properties of the alignment film depending on the light irradiation conditions. Furthermore, since the alignment direction of the liquid crystal molecules is determined at an initial state, PSA can be achieved under no voltage application. In particular, if the liquid crystal display device is in a multi-domain twisted-nematic (TN) mode in which a plurality of domains having different alignment directions from one another are formed in a region corresponding to one pixel in the liquid crystal layer, excellent effects for improving the response property and viewing angle characteristic can be favorably achieved. The number of the domains is preferably 4.

The alignment film provided with an alignment-control function by the photo-alignment treatment preferably contains a photo-reactive functional group. The photo-reactive functional group is preferably a chalkone group, a coumarin group, a cinnamate group, an azobenzene group, or a stilbene group. These photo-reactive functional groups are relatively easily formed at side chains of polymers, and show excellent reactivity in the photo-alignment treatment.

The alignment film provided with an alignment-control function by a photo-alignment treatment is preferably based on a polyimide, a polyamic acid, a polymaleimide, or a polysiloxane. These polymers can be effectively used for an alignment film.

The liquid crystal layer preferably includes liquid crystal molecules having a negative dielectric constant anisotropy. If a liquid crystal material having a negative dielectric constant anisotropy is used as a liquid crystal material, and a vertical alignment film is used as an alignment film, an embodiment of VA mode with excellent contrast properties can be achieved.

Examples of the monomer having an initiator function include a compound represented by the following chemical formula (1):

[Chem. 1]

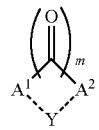

(1)

wherein $A^1$ and $A^2$ are each independently a benzene ring, a biphenyl ring, or a C1-C12 linear or branched alkyl or alkenyl group;

at least one of $A^1$ and $A^2$ includes a -$Sp^1$-$P^1$ group;

a hydrogen atom in $A^1$ and $A^2$ may be substituted with a -$Sp^1$-$P^1$ group, a halogen atom, a —CN group, a —NO$_2$ group, a —NCO group, a —NCS group, a —OCN group, a —SCN group, a —SF$_5$ group, or a C1-C12 alkyl, alkenyl, or aralkyl group, the alkyl or alkenyl group being linear or branched;

two adjacent hydrogen atoms in $A^1$ or $A^2$ may be substituted with a C1-C12 linear or branched alkylene or alkenylene group to form a ring structure;

a hydrogen atom in the alkyl, alkenyl, alkylene, alkenylene, or aralkyl group of $A^1$ and $A^2$ may be substituted with a -$Sp^1$-$P^1$ group;

a —CH$_2$— group in the alkyl, alkenyl, alkylene, alkenylene, or aralkyl group of $A^1$ and $A^2$ may be substituted with an —O— group, a —S— group, a —NH— group, a —CO— group, a —COO— group, a —OCO— group, a —O—COO— group, a —OCH$_2$— group, a —CH$_2$O— group, a —SCH$_2$— group, a —CH$_2$S— group, a —N(CH$_3$)— group, a —N(C$_2$H$_5$)— group, a —N(C$_3$H$_7$)— group, a —N(C$_4$H$_9$)— group, a —CF$_2$O— group, a —OCF$_2$— group, a —CF$_2$S— group, a —SCF$_2$— group, a —N(CF$_3$)— group, a —CH$_2$CH$_2$— group, a —CF$_2$CH$_2$— group, a —CH$_2$CF$_2$— group, a —CF$_2$CF$_2$— group, a —CH=CH— group, a —CF=CF— group, a —C≡C— group, a —CH=CH—COO— group, or a —OCO—CH=CH— group, provided that oxygen atoms, sulfur atoms and nitrogen atoms are mutually apart;

$P^1$ is a polymerizable group;

$Sp^1$ is a C1-C6 linear, branched, or cyclic alkylene or alkyleneoxy group, or a direct bond;

m is 1 or 2;

a dotted line connecting $A^1$ and Y, and a dotted line connecting $A^2$ and Y show an optional bond between $A^1$ and $A^2$ mediated by Y; and Y is a —CH$_2$— group, a —CH$_2$CH$_2$— group, a —CH=CH— group, a —O— group, a —S— group, a —NH— group, a —N(CH$_3$)— group, a —N(C$_2$H$_5$)— group, a —N(C$_3$H$_7$)— group, a —N(C$_4$H$_9$)— group, a —OCH$_2$— group, a —CH$_2$O— group, a —SCH$_2$— group, a —CH$_2$S— group, or a direct bond.

Specific examples of the monomer include compounds represented by the following chemical formulae (2-1) to (2-8):

[Chem. 2]

(2-1)

(2-2)

(2-3)

(2-4)

(2-5)

(2-6)

(2-7)

(2-8)

wherein $R^1$ and $R^2$ are each independently a -$Sp^1$-$P^1$ group, a hydrogen atom, a halogen atom, a —CN group, a —$NO_2$ group, a —NCO group, a —NCS group, a —OCN group, a —SCN group, a —$SF_5$ group, a phenyl group, or a C1-C12 alkyl or aralkyl group, the alkyl group being linear or branched;

at least one of $R^1$ and $R^2$ includes a -$Sp^1$-$P^1$ group;

$P^1$ is a polymerizable group;

$Sp^1$ is a C1-C6 linear, branched, or cyclic alkylene or alkyleneoxy group, or a direct bond;

a hydrogen atom in at least one of $R^1$ and $R^2$, when the at least one of $R^1$ and $R^2$ is a phenyl group or a C1-C12 alkyl or aralkyl group, may be substituted with a fluorine atom, a chlorine atom, or a -$Sp^1$-$P^1$ group; and a —$CH_2$— group in $R^1$ and $R^2$ may be substituted with an —O— group, a —S— group, a —NH— group, a —CO— group, a —COO— group, a —OCO— group, a —O—COO— group, a —$OCH_2$— group, a —$CH_2O$— group, a —$SCH_2$— group, a —$CH_2S$— group, a —$N(CH_3)$— group, a —$N(C_2H_5)$— group, a —$N(C_3H_7)$— group, a —$N(C_4H_9)$— group, a —$CF_2O$— group, a —$OCF_2$— group, a —$CF_2S$— group, a —$SCF_2$— group, a —$N(CF_3)$— group, a —$CH_2CH_2$— group, a —$CF_2CH_2$— group, a —$CH_2CF_2$— group, a —$CF_2CF_2$— group, a —CH=CH— group, a —CF=CF— group, a —C≡C— group, a —CH=CH—COO— group, or a —OCO—CH=CH— group, provided that oxygen atoms, sulfur atoms and nitrogen atoms are mutually apart.

Examples of the $P^1$ include an acryloyloxy group, a methacryloyloxy group, a vinyl group, a vinyloxy group, an acryloylamino group, and a methacryloylamino group.

Furthermore, the polymer layer is preferably formed by polymerization of one or more kinds of monomers each containing a monofunctional or polyfunctional polymerizable group having a ring structure. Examples of such monomers include a compound represented by the following chemical formula (3):

[Chem. 3]

$$P^2—S_p^2—R^4-A^3-(Z-A^4)_n-R^3 \qquad (3)$$

wherein $R^3$ is a —$R^4$-$Sp^2$-$P^2$ group, a hydrogen atom, a halogen atom, a —CN group, a —$NO_2$ group, a —NCO group, a —NCS group, an —OCN group, a —SCN group, a —$SF_5$ group, or a C1-C12 linear or branched alkyl group;

$P^2$ is a polymerizable group;

$Sp^2$ is a C1-C6 linear, branched, or cyclic alkylene or alkyleneoxy group, or a direct bond;

a hydrogen atom in $R^3$ may be substituted with a fluorine atom or a chlorine atom;

a —$CH_2$— group in $R^3$ may be substituted with an —O— group, a —S— group, a —NH— group, a —CO— group, a —COO— group, a —OCO— group, a —O—COO— group, a —$OCH_2$— group, a —$CH_2O$— group, a —$SCH_2$— group, a —$CH_2S$— group, a —$N(CH_3)$— group, a —$N(C_2H_5)$— group, a —$N(C_3H_7)$— group, a —$N(C_4H_9)$— group, a —$CF_2O$— group, a —$OCF_2$— group, a —$CF_2S$— group, a —$SCF_2$— group, a —$N(CF_3)$— group, a —$CH_2CH_2$— group, a —$CF_2CH_2$— group, a —$CH_2CF_2$— group, a —$CF_2CF_2$— group, a —CH=CH— group, a —CF=CF— group, a —C≡C— group, a —CH=CH—COO— group, or a —OCO—CH=CH— group, provided that oxygen atoms, and sulfur atoms are mutually apart;

$R^4$ is a —O— group, a —S— group, a —NH— group, a —CO— group, a —COO— group, a —OCO— group, a —O—COO— group, a —$OCH_2$— group, a —$CH_2O$— group, a —$SCH_2$— group, a —$CH_2S$— group, a —$N(CH_3)$— group, a —$N(C_2H_5)$— group, a —$N(C_3H_7)$— group, a —$N(C_4H_9)$— group, a —$CF_2O$— group, a —$OCF_2$— group, a —$CF_2S$— group, a —$SCF_2$— group, a —$N(CF_3)$— group, a —$CH_2CH_2$— group, a —$CF_2CH_2$— group, a —$CH_2CF_2$— group, a —$CF_2CF_2$— group, a —CH=CH— group, a —CF=CF— group, a —C≡C— group, a —CH=CH—COO— group, a —OCO—CH=CH— group, or a direct bond;

$A^3$ and $A^4$ are each independently a 1,2-phenylene group, a 1,3-phenylene group, a 1,4-phenylene group, a naphthalene-1,4-diyl group, a naphthalene-1,5-diyl group, a naphthalene-2,6-diyl group, a 1,4-cyclohexylene group, a 1,4-cyclohexenylene group, a 1,4-bicyclo[2.2.2]octylene group, a piperidine-1,4-diyl group, a naphthalene-2,6-diyl group, a decahydronaphthalene-2,6-diyl group, a 1,2,3,4-tetrahydronaphthalene-2,6-diyl group, an indane-1,3-diyl group, an indane-1,5-diyl group, an indane-2,5-diyl group, a phenanthrene-1,6-diyl group, a phenanthrene-1,8-diyl group, a phenanthrene-2,7-diyl group, a phenanthrene-3,6-diyl group, an anthracene-1,5-diyl group, an anthracene-1,8-diyl group, an anthracene-2,6-diyl group, or an anthracene-2,7-diyl group;

—$CH_2$— groups in $A^3$ and $A^4$ may be substituted with —O— groups or —S— groups, provided that they are mutually apart;

a hydrogen atom in $A^3$ and $A^4$ may be substituted with a fluorine atom, a chlorine atom, a —CN group, or a C1-C6 alkyl, alkoxy, alkylcarbonyl, alkoxycarbonyl, or alkylcarbonyloxy group;

z is independently a —O— group, a —S— group, a —NH— group, a —CO— group, a —COO— group, a —OCO— group, a —O—COO— group, a —OCH$_2$— group, a —CH$_2$O— group, a —SCH$_2$— group, a —CH$_2$S— group, a —N(CH$_3$)— group, a —N(C$_2$H$_5$)— group, a —N(C$_3$H$_7$)— group, a —N(C$_4$H$_9$)— group, a —CF$_2$O— group, a —OCF$_2$— group, a —CF$_2$S— group, a —SCF$_2$— group, a —N(CF$_3$)— group, a —CH$_2$CH$_2$— group, a —CF$_2$CH$_2$— group, a —CH$_2$CF$_2$— group, a —CF$_2$CF$_2$— group, a —CH=CH— group, a —CF=CF— group, a —C≡C— group, a —CH=CH—COO— group, a —OCO—CH=CH— group, or a direct bond; and n is 0, 1, or 2.

More specific examples of the monomers include compounds represented by the following chemical formulae (4-1) to (4-5):

[Chem. 4]

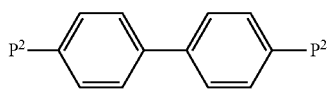
(4-1)

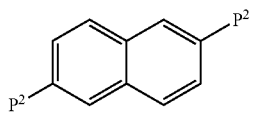
(4-2)

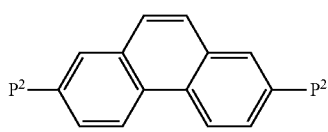
(4-3)

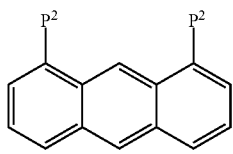
(4-4)

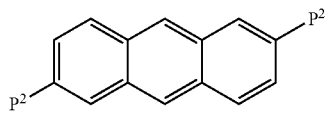
(4-5)

wherein $P^2$s are each independently a polymerizable group.

Examples of the $P^2$ include an acryloyloxy group, a methacryloyloxy group, a vinyl group, a vinyloxy group, an acryloylamino group, and a methacryloylamino group.

The present invention also relates to a method for manufacturing a liquid crystal display device to which the aforementioned technical feature is applied.

Namely, another aspect of the present invention is a method (hereinafter, also referred to as the first manufacturing method of the present invention) for manufacturing a liquid crystal display device, including the steps of:

forming a liquid crystal layer by injecting a liquid crystal composition containing a liquid crystal material and one or more kinds of monomers between a pair of substrates, at least one of the pair of substrates including an alignment film; and forming a polymer layer for controlling the alignment of liquid crystal molecules on the alignment film by exposing the liquid crystal layer to visible light to polymerize at least one of the one or more kinds of monomers, wherein at least one of the one or more kinds of monomers is a monomer polymerizable upon exposure to visible light. The configurations of the method for manufacturing a liquid crystal display device are the same as those explained for the aforementioned liquid crystal display device. Accordingly, the use of monomers polymerizable upon exposure to visible light prevents damages to components such as a liquid crystal layer and an alignment film, and thus enables to avoid deterioration of the electric properties of the liquid crystal display device.

Meanwhile, another aspect of the present invention is a method (hereinafter, also referred to as the second manufacturing method of the present invention) for manufacturing a liquid crystal display device, including the steps of: forming a liquid crystal layer by injecting a liquid crystal composition containing a liquid crystal material, one or more kinds of polymerization initiators, and one or more kinds of monomers between a pair of substrates, at least one of the pair of substrates including an alignment film; and forming a polymer layer for controlling the alignment of liquid crystal molecules on the alignment film by exposing the liquid crystal layer to visible light to initiate polymerization of the one or more kinds of monomers by the one or more kinds of polymerization initiators.

The second manufacturing method of the present invention also prevents damages to components such as a liquid crystal layer and an alignment film. Thus, the method produces the same effect as the steps using monomers polymerizable upon exposure to light. However, a polymerization initiator may remain in the liquid crystal layer after polymerization of the monomers. In view of this, the first manufacturing method of the present invention is more preferable for further enhancement of the electric property of the liquid crystal display device.

The methods for manufacturing a liquid crystal display device according to the present invention are not especially limited as long as these steps are essentially included. The manufacturing method may include other steps.

The preferable configurations of the methods for manufacturing a liquid crystal display device are also the same as those explained for the aforementioned liquid crystal display device.

The one or more kinds of monomers preferably include two or more kinds of monomers, and the monomer polymerizable upon exposure to visible light is preferably a monomer capable of polymerizing the other kinds of monomers (a monomer having an initiator function). The use of the monomer having an initiator function enables the use of many currently available monomers which are not polymerizable by visible light as materials for a polymer layer. Thus, such a monomer is very useful for obtaining desired alignment films and polymer layers. Examples of the monomer having an initiator function include monomers including structures which may generate radicals upon exposure to visible light.

The liquid crystal layer preferably includes liquid crystal molecules having a negative dielectric constant anisotropy. If a liquid crystal material having a negative dielectric constant anisotropy is used as a liquid crystal material, and a vertical alignment film is used as an alignment film, an embodiment of VA mode with excellent contrast properties can be achieved.

The manufacturing method preferably includes a step of a photo-alignment treatment on the alignment film before the injection of the liquid crystal composition. This enables to change the properties of the alignment film depending on the light irradiation conditions. Furthermore, since the alignment direction of the liquid crystal molecules is determined at an initial state, PSA polymerization can be achieved under no voltage application.

The alignment film preferably contains a photo-reactive functional group. The photo-reactive functional group is preferably a chalkone group, a coumarin group, a cinnamate group, an azobenzene group, or a stilbene group. These photo-reactive functional groups are relatively easily formed at side chains of polymers, and show excellent reactivity in the photo-alignment treatment.

The alignment film is preferably based on a polyimide, a polyamic acid, a polymaleimide, or a polysiloxane. These polymers can be effectively used for an alignment film.

Preferably, the manufacturing method further includes a step of providing a backlight on the opposite side to the liquid crystal layer between the pair of substrates. Preferably, the step of providing the backlight is performed before the step of forming the polymer layer, and the one or more kinds of monomers are polymerized by visible light irradiated from the backlight. Since visible light is used for the PSA polymerization step in the present invention, light from a backlight can be used. Thus, it is possible to efficiently carry out the PSA polymerization step without a major change in the conventional manufacturing flow. The backlight may be placed on either one of the pair of substrates as the visible light irradiation from the backlight produces the same effect regardless of on which of the substrates the backlight is placed. Furthermore, in an embodiment in which a color filter is formed on a TFT substrate, as in CF on Array (COA) mode, a backlight may be placed on either one of a pair of substrates constituting the embodiment.

Preferably, the manufacturing method further includes a step of applying two polarizing plates respectively to the pair of substrates, each polarizing plate being provided on a surface on the opposite side to the liquid crystal layer between the pair of substrates; the step of applying the polarizing plates is performed before the step of forming the polymer layer; and the one or more kinds of monomers are polymerized by exposure to visible light incident through the polarizing plates. Since visible light is used for the PSA polymerization step in the present invention, the liquid crystal layer can be exposed to visible light after application of the polarizing plates, thereby avoiding extra equipment investment. Thus, it is possible to achieve not only a significant cut in the manufacturing cost but also efficient manufacturing steps.

The step of forming a polymer layer may be performed while no voltage is applied to the liquid crystal layer or while a voltage less than a threshold is applied to the liquid crystal layer. If the alignment direction of the liquid crystal molecules is set beforehand by the alignment film, the PSA polymerization is possible without application of a threshold or higher voltage. The step of forming the polymer layer may be performed while a threshold or higher voltage is applied to the liquid crystal layer.

If liquid crystals having a negative dielectric constant anisotropy are used, preferably the long axes of the liquid crystal molecules in the liquid crystal layer are tilted at an angle larger than 0° but not larger than 10° with respect to the normal direction of the substrate surface when no voltage is applied to the liquid crystal layer or a voltage less than a threshold is applied to the liquid crystal layer. This reduces light leakage due to the birefringence of the liquid crystal molecules in black display state, thus enabling to maintain a high contrast ratio. Furthermore, the liquid crystal molecules having tilt angles enable to allow the liquid crystal molecules to have a high response rate.

Examples of the monomers favorably used in the methods for manufacturing a liquid crystal display device of the present invention include the same compounds as those favorably used in the liquid crystal display devices of the present invention. Namely, examples of preferable embodiments are as follows: (a) at least one of the one or more kinds of monomers is a compound represented by the chemical formula (1); (b) the compound represented by the chemical formula (1) is any of compounds represented by the chemical formulae (2-1) to (2-8); (c) the $P^1$ is an acryloyloxy group, a methacryloyloxy group, a vinyl group, a vinyloxy group, an acryloylamino group, or a methacryloylamino group; (d) the polymer layer is further formed by one or more kinds of monomers each containing a monofunctional or polyfunctional polymerizable group having a ring structure; (e) the one or more kinds of monomers each containing a monofunctional or polyfunctional polymerizable group having a ring structure is a compound represented by the chemical formula (3); (f) the compound represented by the chemical formula (3) is any of compounds represented by the chemical formulae (4-1) to (4-5); and (g) the $P^2$ is an acryloyloxy group, a methacryloyloxy group, a vinyl group, a vinyloxy group, an acryloylamino group, or a methacryloylamino group.

Advantageous Effects of Invention

The present invention enables to provide a liquid crystal display device which can prevent Δtilt when the voltage is changed to another level from a previously applied level and thus can reduce the occurrence of image sticking.

DESCRIPTION OF EMBODIMENTS

Figure 1:
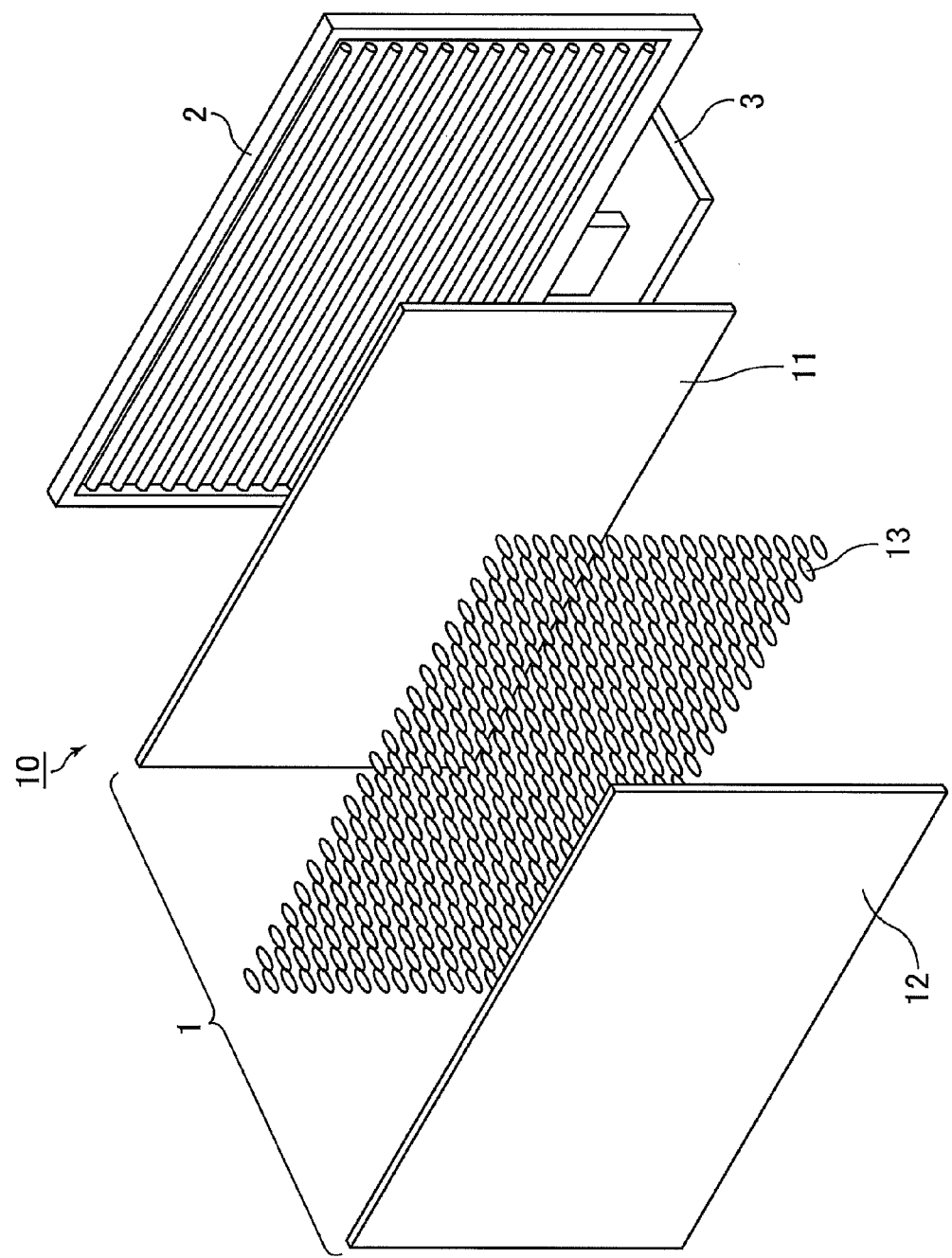
FIG. 1 is an exploded perspective view schematically illustrating a liquid crystal television set according to Embodiment 1.

The present invention will be mentioned in more detail referring to the drawings in the following embodiments, but is not limited to these embodiments.

The liquid crystal display device of the present invention, and a liquid crystal display device manufactured by the manufacturing method of the present invention exert excellent display characteristic when they are used in display devices such as television sets, personal computers, mobile phones, and information displays.

Embodiment 1

Embodiment 1 explains the case where the liquid crystal display device of the present invention, or a liquid crystal display device manufactured by the manufacturing method of the present invention is applied to a television set. FIG. 1 is an exploded perspective view schematically illustrating a liquid crystal television set according to Embodiment 1.

As shown in FIG. 1, a liquid crystal television set 10 according to Embodiment 1 includes a liquid crystal display panel 1, a backlight 2 for supplying light to the liquid crystal display panel, and a base 3 for supporting the liquid crystal display panel 1 and the backlight 2. The liquid crystal display panel 1 includes a thin film transistor substrate (TFT substrate) 11, a color filter substrate (CF substrate) 12, and a liquid crystal layer 13 enclosed between the TFT substrate 11 and the CF substrate 12. A polarizing plate is applied to the TFT substrate 11 on a surface on the opposite side to the liquid crystal layer 13. A polarizing plate is also applied to the CF substrate 12 on a surface on the opposite side to the liquid crystal layer 13. A retarder may be applied to each polarizing plate, if needed. The backlight 2 is provided on a rear side of the liquid crystal display panel 1 (the opposite side to the display surface side of the liquid crystal display panel). Moreover, peripheral equipment (not shown) for displaying televised images on the screen, such as wirings or a driver, is mounted on a lateral or rear side of the liquid crystal display panel 1.

The liquid crystal layer 13 is filled with a liquid crystal material having a characteristic of aligning in a specific direction when a certain voltage is applied thereto. The alignment of liquid crystal molecules in the liquid crystal layer 13 is controlled by application of a threshold or higher voltage. The liquid crystal material filling the liquid crystal layer 13 may have a positive dielectric constant anisotropy or a negative dielectric constant anisotropy. For example, a material having a negative dielectric constant anisotropy is used in VA mode in which the initial tilt is set in a direction substantially perpendicular to the surface of a substrate.

Figure 2:
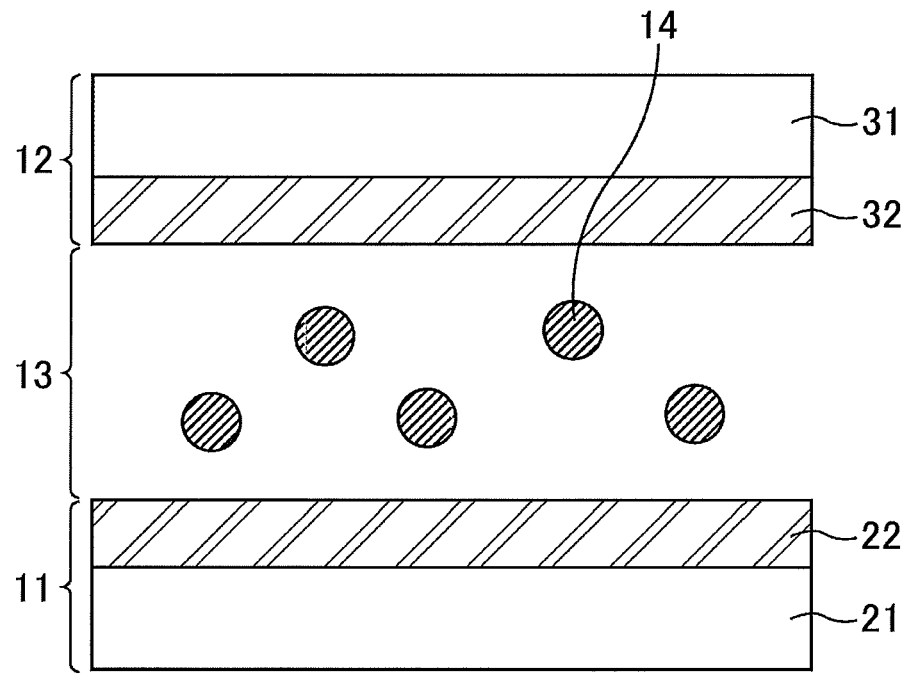
FIG. 2 is a cross-sectional view schematically illustrating a liquid crystal display panel according to Embodiment 1 before the PSA polymerization step.
Figure 3:
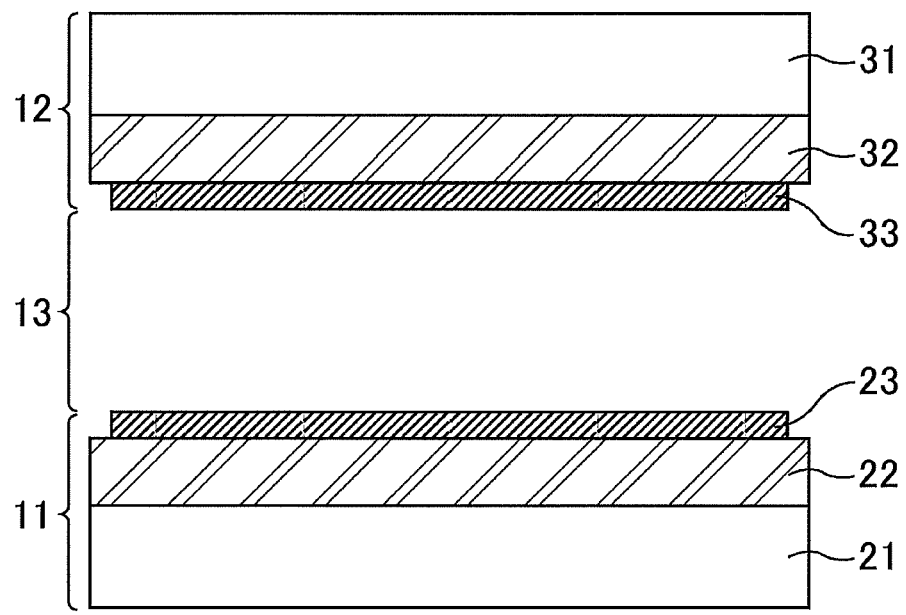
FIG. 3 is a cross-sectional view schematically illustrating a liquid crystal display panel according to Embodiment 1 after the PSA polymerization step.

FIG. 2 is a cross-sectional view schematically illustrating a liquid crystal display panel according to Embodiment 1 before the PSA polymerization step. FIG. 3 is a cross-sectional view schematically illustrating a liquid crystal display panel according to Embodiment 1 after the PSA polymerization step. The TFT substrate 11 includes an insulating transparent substrate 21 made of glass or the like, on which various wirings, a pixel electrode, a TFT, and the like are formed. The CF substrate 12 includes an insulating transparent substrate 31 made of glass or the like, on which a color filter, a black matrix, a common electrode, and the like are formed.

The TFT substrate 11 is provided with an alignment film 22 on the surface contacting the liquid crystal layer. The color filter substrate 12 is provided with an alignment film 32 on the surface contacting the liquid crystal layer. The alignment films 22 and 32 are based on, for example, a polymer material such as a polyimide, a polyamic acid, a polymaleimide, or a polysiloxane. The alignment films 22 and 32 having an alignment-treated surface formed by, for example, a rubbing treatment or a photo-alignment treatment can set the pretilt angle (initial tilt) of the liquid crystal molecules. In view of the improvement in the viewing angle characteristic and the response property, preferably the alignment films each include a photo-alignment material, and also a multi-domain is formed by exposing each pixel to light from a plurality of directions. Preferable example of the photo-alignment material include materials containing a compound that has a photo-reactive functional group, such as a chalkone group, a coumarin group, a cinnamate group, an azobenzene group, or a stilbene group. Examples of the light for the photo-alignment treatment include polarized UV, unpolarized UV, and ion beam.

Examples of the multi-domain alignment system to be controlled by the alignment film include multi-domain twisted nematic (TN) mode, multi-domain vertical alignment twisted nematic (VAIN) mode, multi-domain electrically controlled birefringence (ECB) mode, multi-domain vertical alignment electrically controlled birefringence (VAECB) mode, and multi-domain vertical alignment hybrid-aligned nematic (VAHAN) mode. In view of the improvement in the viewing angle, the number of domains to be formed is preferably an even number, and more preferably a multiple of 4.

The viewing angle is greatly improved especially in VAIN mode in which the alignment treatment direction of one of the pair of substrates is orthogonal to that of the other substrate, and a region corresponding to one pixel of the liquid crystal layer 13 is divided into four domains. Meanwhile, in VAIN mode with four domains, a highly precise pretilt control is necessary to prevent occurrence of image sticking. The liquid crystal display device according to Embodiment 1 can achieve excellently stable pretilt due to the polymer layer formed on the alignment film. Thus, even in such a mode, the alignment is controlled sufficiently enough to achieve excellent display quality.

Liquid crystal molecules and one or more kinds of monomers 14 exist in the liquid crystal layer 13 before the PSA polymerization step. The monomer(s) 14 begins to polymerize in the PSA polymerization step by exposure to visible light so that PSA layers (polymer layers) 23 and 33 are formed on the alignment films 22 and 32, respectively. Although FIG. 3 illustrates an embodiment in which the PSA layers 23 and 33 cover the entire surfaces of the alignment films 22 and 32, respectively, practically PSA layers may be formed in a dotted pattern and may have uneven thickness.

The steps are specifically performed as follows. First, a liquid crystal composition including a liquid crystal material and the one or more kinds of monomers 14 is injected between the TFT substrate 11 and the CF substrate 12. Subsequently, a polarizing plate is applied to each of the TFT substrate 11 and the CF substrate 12 to form a liquid crystal display panel. Then, the backlight 2 is provided on the liquid crystal display panel 1 on the side opposite to the display surface side. Next, the liquid crystal layer 13 is exposed to a certain amount of visible light incident from the backlight 2 to polymerize the monomer(s) 14.

According to Embodiment 1, visible light, not ultraviolet rays, is used in the PSA polymerization step. Thus, degradation or damages to the components, such as the liquid crystal layer or the alignment film can be greatly reduced. Moreover, according to Embodiment 1, the PSA polymerization step can be performed after the polarizing plates and the backlight are mounted on the liquid crystal display panel. Thus, unlike the case of ultraviolet rays irradiation, no additional equipment is necessary, which greatly contributes to efficient manufacturing steps and cost cut.

At least one kinds of the monomer (s) 14 used in Embodiment 1 by itself causes a chemical reaction upon exposure to visible light to not only cause the polymerization of itself but also function as an initiator for other monomers to initiate the polymerization of the other monomers. Examples of the polymerization reaction according to Embodiment 1 include a chain polymerization reaction in which a monomer having an initiator function generates radicals upon exposure to visible light, and the radicals serving as active species initiate a series of polymerizations. Meanwhile, in the case of using a visible light-inducible polymerization initiator, the monomer (s) 14 used in Embodiment 1 may not be capable of causing a chemical reaction upon exposure to visible light by itself.

There is no limitation on the voltage application to the liquid crystal layer in the PSA polymerization step in Embodiment 1. The PSA polymerization step may be performed (i) while no voltage is applied to the liquid crystal layer, (ii) while a voltage less than a threshold is applied to the liquid crystal layer, or (iii) while a threshold or higher voltage is applied to the liquid crystal layer.

Examples of the monomer which is polymerized upon exposure to visible light and initiates the polymerization of other monomers include compounds represented by the chemical formula (1), and preferably compounds represented by the chemical formulae (2-1) to (2-8). If such a compound is used, another polymerization initiator needs not to be added in the liquid crystal material, and thus the polymerization reaction can be initiated only by exposure to visible light. Since the above compounds are capable of generating radicals upon exposure to visible light without an initiator, the use of these compounds enables to form a PSA layer even if another monomer material which is not polymerized by itself upon exposure to visible light is used, and further enables to form a PSA layer which can reduce the change in the Δtilt of the liquid crystal molecules. Examples of the other monomers include compounds represented by the chemical formula (3), and more preferably compounds represented by the chemical formulae (4-1) to (4-5).

Figure 4:
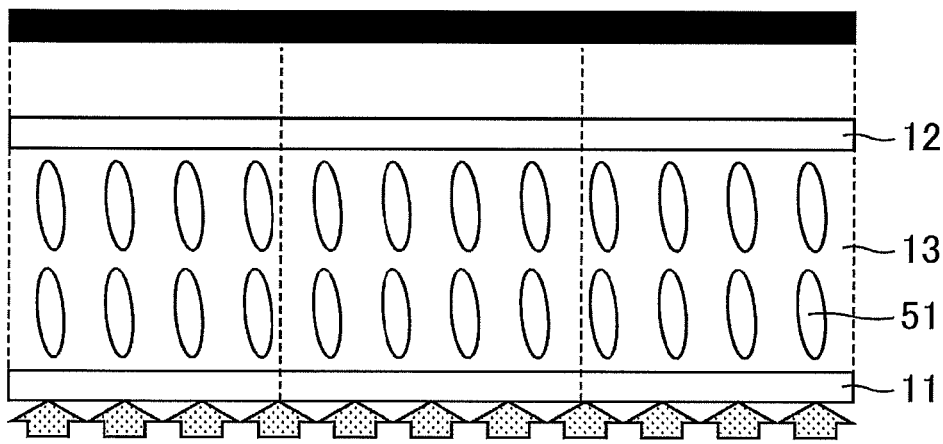
FIG. 4 is a cross-sectional view schematically illustrating a liquid crystal display panel according to Embodiment 1 under no voltage application.
Figure 5:
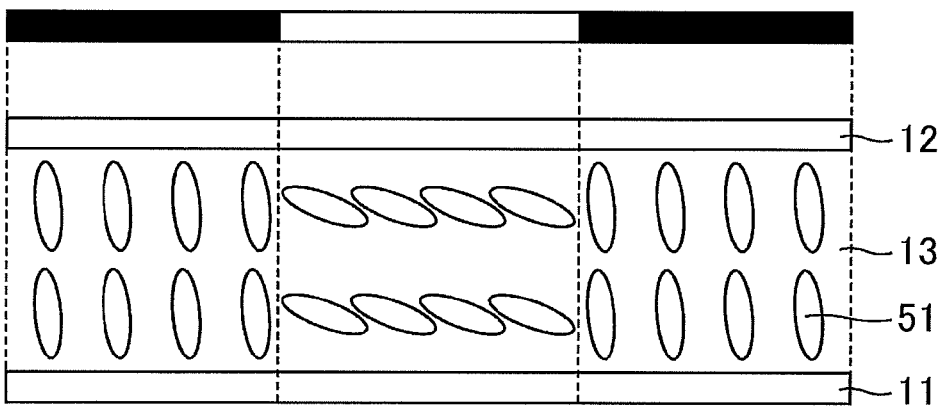
FIG. 5 is a cross-sectional view schematically illustrating a liquid crystal display panel according to Embodiment 1 under application of a voltage for white display (only the middle region).
Figure 6:
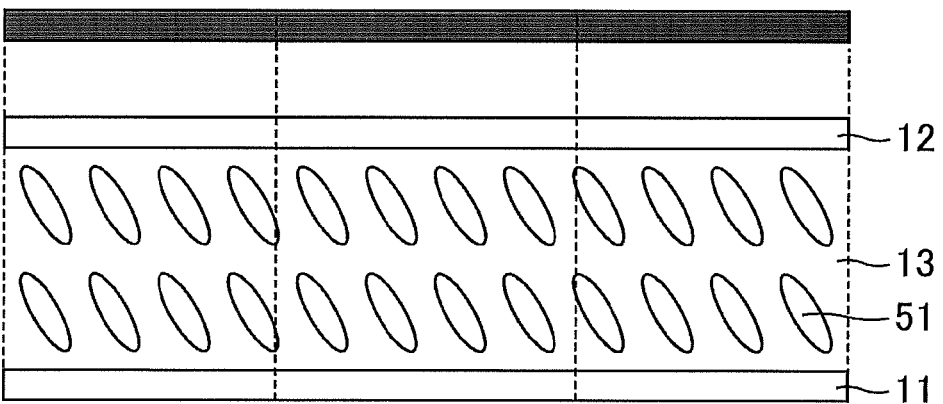
FIG. 6 is a cross-sectional view schematically illustrating a liquid crystal display panel according to Embodiment 1. The view shows the behavior of the liquid crystal molecules when the voltage is changed to a voltage for halftone display after application of a voltage for a certain period of time.

The following explains the principle of how the occurrence of image sticking is reduced in Embodiment 1. FIGS. 4 to 6 each are a cross-sectional view schematically illustrating a liquid crystal display panel according to Embodiment 1. FIG. 4 illustrates the behavior of the liquid crystal molecules when no voltage is applied. FIG. 5 illustrates the behavior of the liquid crystal molecules when a voltage for white display is applied (only the middle region). FIG. 6 illustrates the behavior of the liquid crystal molecules when the voltage is changed to a voltage for halftone display after application of a voltage for a certain period of time. The liquid crystal molecules used have a negative dielectric constant anisotropy.

As shown in FIGS. 4 to 6, the liquid crystal display panel according to Embodiment 1 includes the pair of substrates 11 and 12 each having a polarizing plate applied thereto, and the liquid crystal layer 13 disposed between the pair of substrates 11 and 12. Under no voltage application shown in FIG. 4, liquid crystal molecules 51 align in a substantially perpendicular direction to the surfaces of the substrates 11 and 12. The regions in both ends are regions of black display to which no voltage or a low voltage of threshold or lower is applied. In this state, light having passed through one of the polarizing plates penetrates the liquid crystal layer 13, and is then blocked by the other polarizing plate. In contrast, in the region to which a voltage for white display is applied shown in FIG. 5, the liquid crystal molecules 51 align in a substantially horizontal direction to the surfaces of the substrates 11 and 12. In this state, light having passed through one of the polarizing plates penetrates the liquid crystal layer 13, and then further passes through the other polarizing plate to exit as display light. Under application of a voltage for halftone display shown in FIG. 6, the liquid crystal molecules 51 uniformly align in an orthogonal direction to the surfaces of the substrates 11 and 12 regardless of whether the region is in white display or black display before changing the voltage. This is due to very little change in the alignment-control capability of the alignment film and the PSA layer for the liquid crystal molecules (i.e. the Δtilt is small) in Embodiment 1, even after the application of a constant voltage for a certain period of time. Hence, the problem of image sticking caused by insufficient returning of the tilt of the liquid crystal molecules is solved, enabling the manufacturing of a liquid crystal television set with excellent display quality.

Regarding the liquid crystal television set according to Embodiment 1, the components, weight ratio, and the like of monomers remaining in the liquid crystal composition can be analyzed by disassembling the liquid crystal display panel and performing gas chromatography mass spectroscopy (GC-MS) on the liquid crystal composition. Moreover, analysis of the surface of the alignment film by time-of-flight secondary ion mass spectrometry (TOF-SIMS) can determine the components of the material of the alignment film.

Example 1

A pair of glass substrates each having an indium tin oxide (ITO) electrode on its surface were prepared. A solution of a polyamic acid having a cinnamate group as a photo-reactive functional group serving as an alignment film material was applied by a spin-coating method to the entire surfaces of the substrates. Meanwhile, a chalkone group, a coumarin group, a stilbene group or the like may also be used as the photo-reactive functional group. Furthermore, a partially or fully imidized polyimide compound, or a siloxane compound may be used as the polymer. The glass substrates used were glass substrates #1737 (manufactured by Corning Inc.). Subsequently, the substrates were allowed to stand at 90° C. for one minute for temporary drying the applied solution. Then, the substrates were allowed to stand at 200° C. for 40 minutes under nitrogen atmosphere for baking the temporary dried film.

Next, an alignment treatment of the surfaces of the substrates was performed by exposing the surfaces to linear polarized ultraviolet rays (p-polarized) from an angle of 40° with respect to the normal direction of the substrate surface at an intensity of 60 mJ/cm² at a wavelength of 313 nm.

Next, a thermosetting seal material (HC1413FP, manufactured by Mitsui Chemicals Inc.) was printed on one of the substrates by using a screen plate. Further, beads (SP-2035, manufactured by Sekisui Chemical Co., Ltd.) having a diameter of 3.5 μm were dispersed on the other substrate. Subsequently, the pair of substrates were disposed in a manner that the polarization directions of ultraviolet rays irradiating the respective substrates were orthogonal to each other, and then the substrates were bonded to each other.

Thereafter, the bonded substrates were heated in a nitrogen-purged furnace at 200° C. for 60 minutes while applying a pressure of 0.5 kgf/cm² thereto, and thereby the seal material was cured.

A liquid crystal composition containing a liquid crystal material having a negative dielectric constant anisotropy and a monomer for PSA was injected into a cell prepared with the above method under vacuum.

An inlet through which the liquid crystal composition was injected was plugged with an ultraviolet ray-curable resin (TB3026E, manufactured by ThreeBond Co., Ltd.) and was exposed to ultraviolet rays for sealing the inlet. The wavelength of the ultraviolet rays was 365 nm. Light was blocked in pixel portions to avoid the influence of the ultraviolet rays as much as possible.

Next, for removing the flow alignment of the liquid crystal molecules, a realignment treatment of heating the cell at 130° C. for 40 minutes to allow the liquid crystal layer to have isotropic phase was performed.

Then, two polarizing plates were respectively applied to the pair of substrates so that a liquid crystal display panel of VAIN mode with one domain was obtained. The polarizing axes of the polarizing plates on both the substrates were adjusted such that the axes were orthogonal to each other.

Next, in order to subject the liquid crystal display panel to a PSA polymerization step, the liquid crystal layer was exposed to light from the backlight for 100 hours through the polarizing plate placed in between under no voltage application so that the monomers in the liquid crystal layer were polymerized. Since the light irradiated from the backlight was visible light, it was not cut by the polarizing plate.

In Example 1, a combination of monomers represented by the following chemical formulae (5) and (6) was used. A compound represented by the following chemical formula (5) is a bifunctional methacrylate monomer having a benzyl structure, and a compound represented by the following chemical formula (6) is a bifunctional methacrylate monomer having a phenanthrene structure. The compound represented by the following chemical formula (6) is almost not polymerized by exposure to visible light. In contrast, the compound represented by the following chemical formula (5) includes a structure which generates radicals upon exposure to visible light and thus also serves as an initiator.

[Chem. 5]

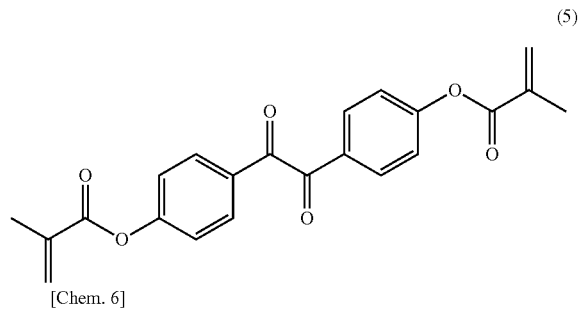

(5)

[Chem. 6]

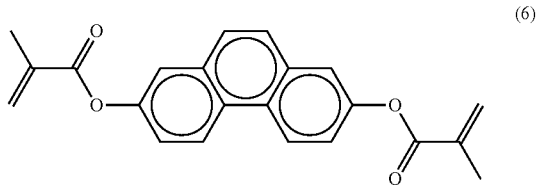

(6)

Figure 7:
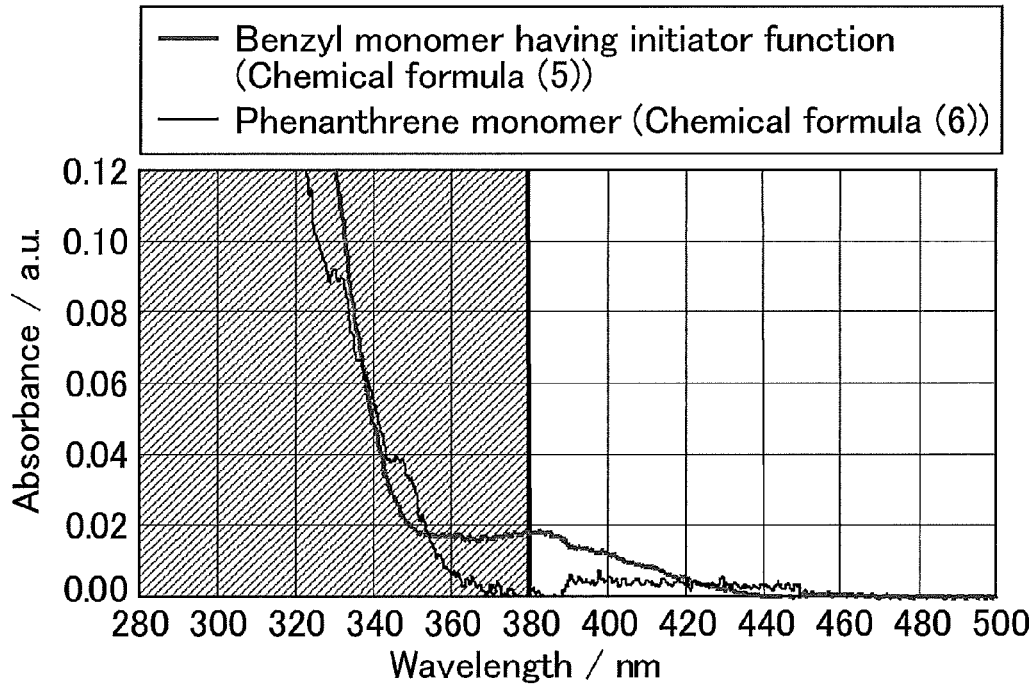
FIG. 7 is a graph showing the absorption spectra of monomers represented by chemical formulae (5) and (6) below.

FIG. 7 is a graph showing the absorption spectra of the monomers represented by the chemical formulae (5) and (6). Since the PSA polymerization step is performed by light from the backlight through the polarizing plate in this embodiment, light having a wavelength shorter than 380 nm (the left side of the 380 nm boundary in FIG. 7) is cut by the polarizing plate. As shown in FIG. 7, the benzyl monomer represented by the chemical formula (5) absorbs light having a wavelength of 380 nm or longer. In contrast, the phenanthrene monomer represented by the chemical formula (6) absorbs almost no light having a wavelength of 380 nm or longer. According to the present embodiment, even in the aforementioned case, the benzyl monomer represented by the chemical formula (5) generates radicals serving as active species, and the radicals initiate the polymerization of the phenanthrene monomer represented by the chemical formula (6). Moreover, the polymerization of the benzyl monomer represented by the chemical formula (5) is also initiated by the radicals, so that the polymer forms part of a PSA layer.

Evaluation Test 1

Figure 8:
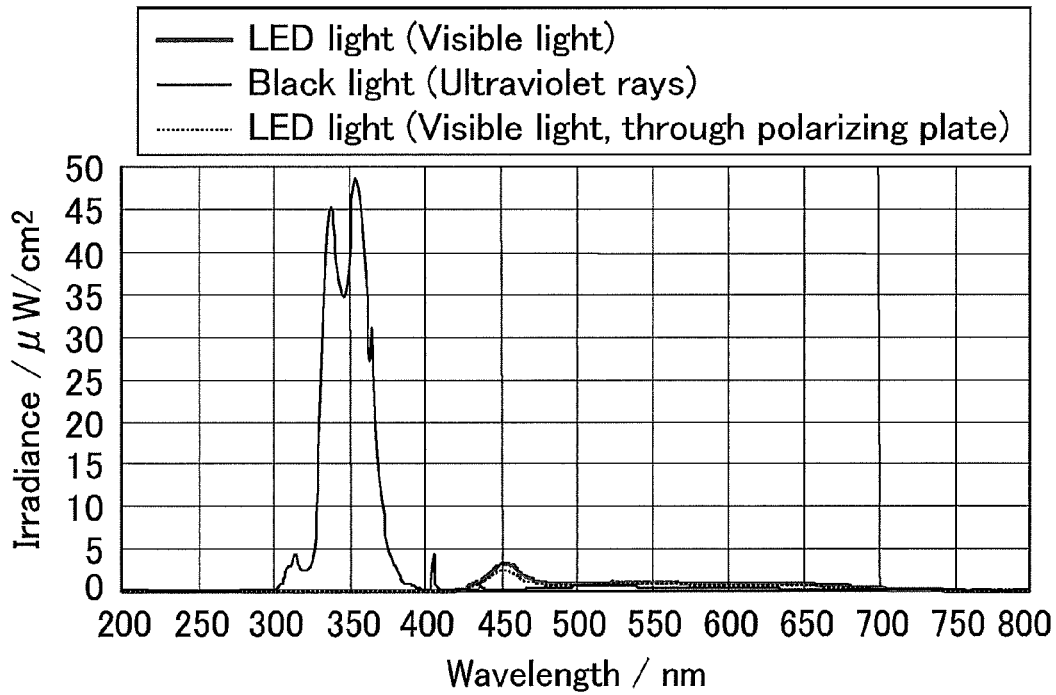
FIG. 8 is a graph showing the irradiance spectra of a light source used in Evaluation Test 1.

In order to check the image sticking-reducing effect of the liquid crystal display panel prepared in Example 1, a liquid crystal display panel of Comparative Example 1 and a liquid crystal display panel of Comparative Example 2 were further prepared. The liquid crystal display panel prepared in Comparative Example 1 is a VAIN mode liquid crystal display panel with one domain prepared without performing a PSA polymerization step. The liquid crystal display panel prepared in Comparative Example 1 is almost the same as those prepared in Example 1 and Comparative Example 2, except that the liquid crystal layer contains no monomer and that it is prepared without performing a PSA polymerization step. Meanwhile, the liquid crystal display panel prepared in Comparative Example 2 is almost the same as one prepared in Example 1, except that the exposure to light is performed under different conditions in the PSA polymerization step. The exposure to light for the PSA polymerization step in Example 1 includes exposure to light (visible light) from a LED through the polarizing plate for 100 hours. In contrast, the exposure to light for the PSA polymerization step in Comparative Example 2 includes exposure to black light (ultraviolet rays) through no polarizing plate for 40 minutes. FIG. 8 is a graph showing the irradiance spectra of a light source used in Evaluation Test 1.

Figure 9:
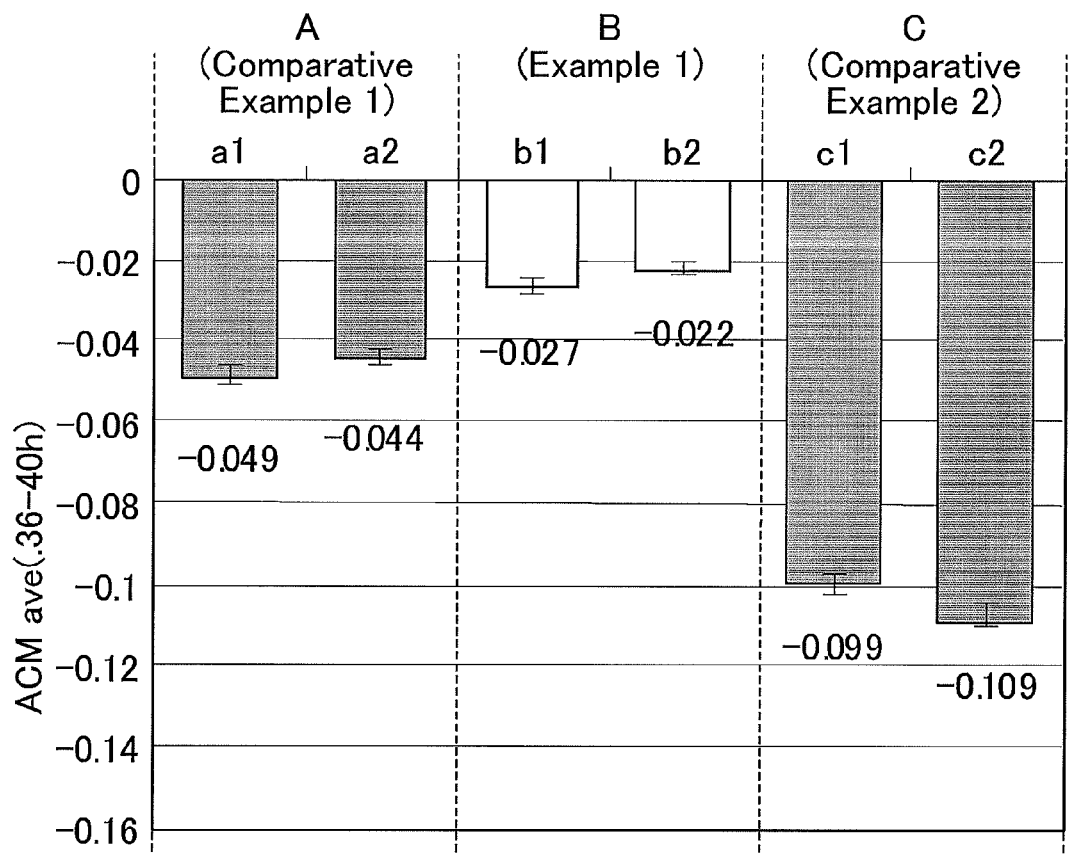
FIG. 9 is a graph showing the measured Δtilt values of liquid crystal display panels in Example 1, Comparative Example 1, and Comparative Example 2.

FIG. 9 is a graph showing the measured value of change in the tilt angle (Δtilt) from the initial tilt angle in the liquid crystal display panels in Example 1, Comparative Example 1, and Comparative Example 2. In FIG. 9, the A graphs (two samples of a1 and a2) show the results of Comparative Example 1, the B graphs (two samples of b1 and b2) show the results of Example 1, and the C graphs (two samples of c1 and c2) show the results of Comparative Example 2.

The Δtilt value was obtained as follows: an AC voltage of 7.5 V and 30 Hz was continuously applied to the liquid crystal display panel for 40 hours, and the tilt angle was measured every one hour while the voltage application was temporarily stopped. The amount of change in the tilt angle between each measured tilt angle and the tilt angle under no voltage application was calculated. An average value of the calculated amounts of change in a period of 36 to 40 hours from the start of the voltage application was obtained as the Δtilt value. The tilt angle was measured with a commercially available ellipsometer OPTIPRO (manufactured by SHINTEC, Inc.).

Comparison between the A graphs and B graphs in FIG. 9 proves that the liquid crystal display panel prepared through the PSA polymerization step using visible light had a smaller Δtilt value, even if both panels were of VATN mode. Moreover, comparison between the B graphs and C graphs in FIG. 9 proves that the liquid crystal display panel prepared through the PSA polymerization step with exposure to black light had a significantly large Δtilt value. This is supposedly because the exposure to black light degraded or damaged the liquid crystal layer, the alignment film, or the like. In contrast to Comparative Examples 1 and 2, the Δtilt value was greatly reduced when the PSA polymerization step was performed under the conditions in Example 1. Specifically, the values in the B graphs were reduced to about ¼ of the values in the C graphs and ½ of the values in the A graphs. This is considered due to the use of visible light in the PSA polymerization treatment, and the use of the monomer materials in the aforementioned combination. As mentioned above, the Δtilt value was greatly reduced so that the occurrence of image sticking was reduced in Example 1.

Example 2, Example 3

In Example 2, a liquid crystal display panel was prepared in the same manner as in Example 1, except that a biphenyl monomer was used as the other monomer instead of the phenanthrene monomer. In Example 3, a liquid crystal display panel was prepared in the same manner as in Example 1, except that a biphenyl monomer was also used as the monomer in addition to the phenanthrene monomer.

In Example 2, a combination of a monomer represented by the chemical formula (5) and a monomer represented by the following chemical formula (7) was used. In Example 3, a combination of a monomer represented by the chemical formula (5), a monomer represented by the chemical formula (6), and a monomer represented by the following chemical formula (7) was used. The compound represented by the following chemical formula (7) is a bifunctional methacrylate monomer having a biphenyl structure. The compound represented by the chemical formula (6) and the compound represented by the following chemical formula (7) are not polymerized by exposure to visible light. In contrast, the compound represented by the chemical formula (5) includes a structure which generates radicals upon exposure to visible light, and thus functions as an initiator.

[Chem. 7]

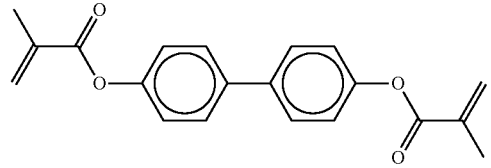

(7)

Figure 10:
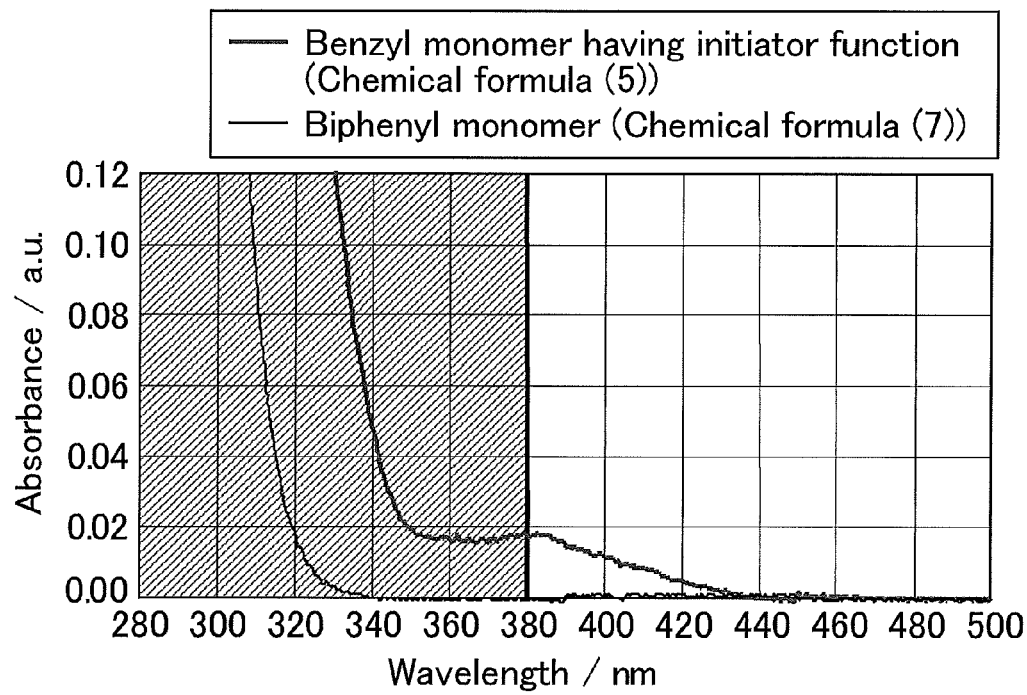
FIG. 10 is a graph showing the absorption spectra of monomers represented by chemical formulae (5) and (7) below.

FIG. 10 is a graph showing the absorption spectra of the monomers represented by the chemical formulae (5) and (7). Since the PSA polymerization step is performed by light from the backlight through the polarizing plate in this embodiment, light having a wavelength shorter than 380 nm (the left side of the 380 nm boundary in FIG. 10) is cut by the polarizing plate. As shown in FIG. 10, the biphenyl monomer represented by the chemical formula (7) absorbs almost no light having a wavelength of 380 nm or longer. According to the present embodiment, even in the aforementioned case, the benzyl monomer represented by the chemical formula (5) generates radicals serving as active species, and the radicals initiate the polymerizations of the phenanthrene monomer represented by the chemical formula (6) and the biphenyl monomer represented by the chemical formula (7). Moreover, the polymerization of the benzyl monomer represented by the chemical formula (5) is also initiated by the radicals, so that the polymer forms part of a PSA layer.

Evaluation Test 2

Figure 11:
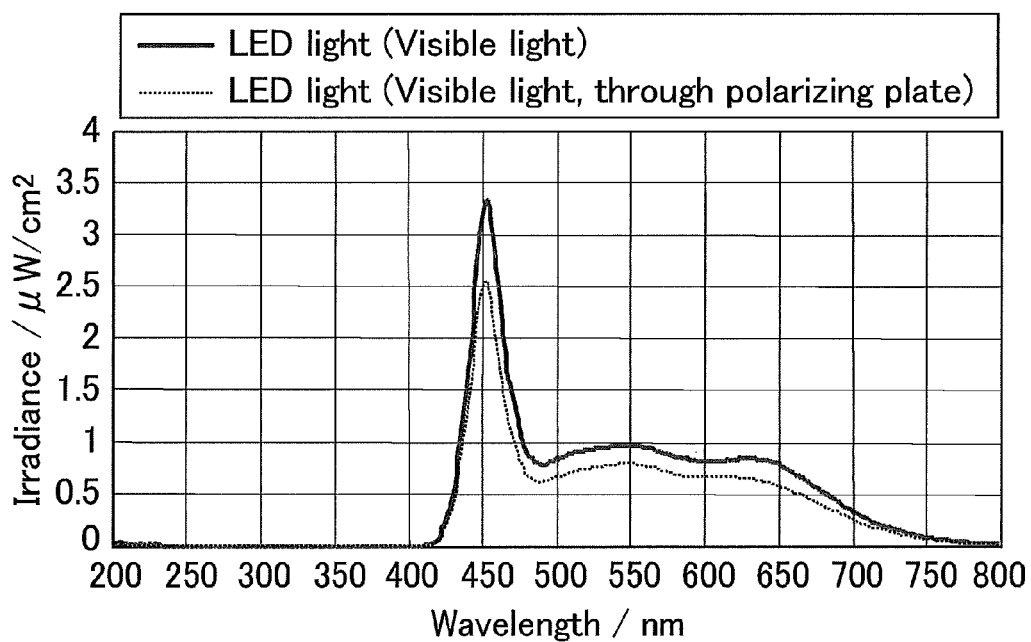
FIG. 11 is a graph showing the irradiance spectra of a light source used in Evaluation Test 2.

In order to check the image sticking-reducing effect of the liquid crystal display panels prepared in Examples 2 and 3, another liquid crystal display panel of Comparative Example 1 was prepared. The exposure to light for the PSA polymerization step in Examples 2 and 3 includes exposure to light (visible light) from a LED through the polarizing plate for 100 hours. FIG. 11 is a graph showing the irradiance spectra of a light source used in Evaluation Test 2.

Figure 12:
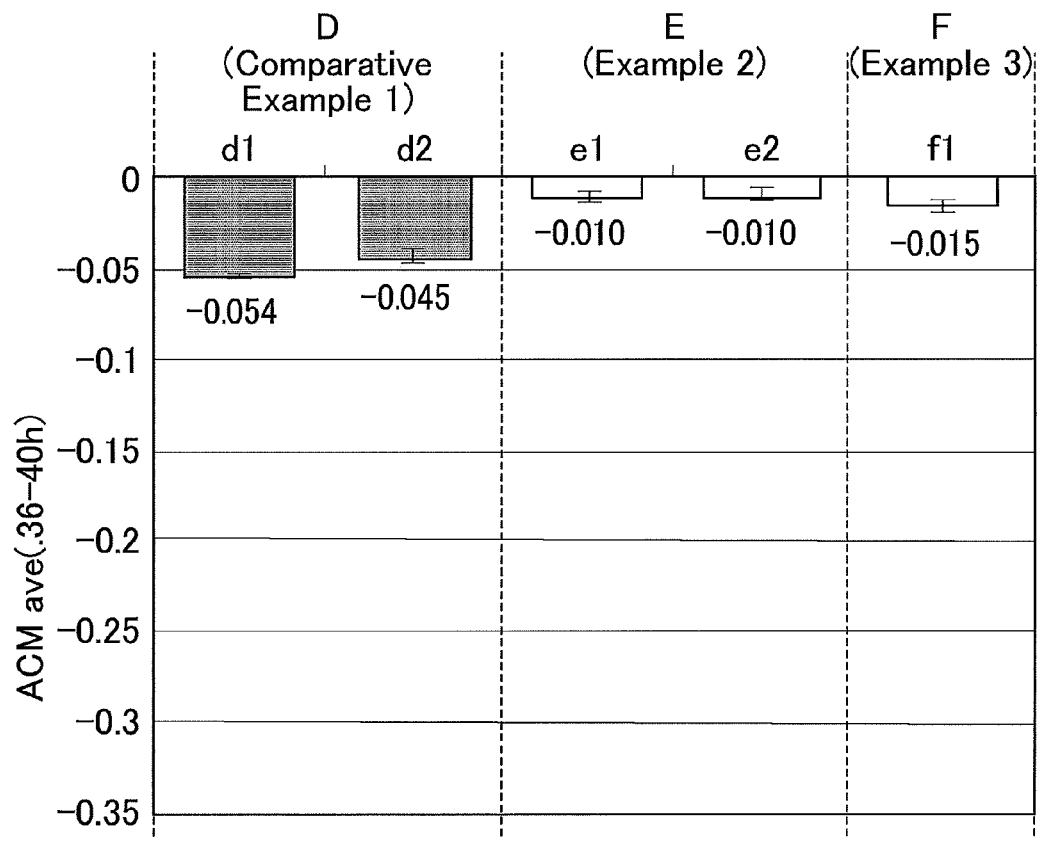
FIG. 12 is a graph showing the measured Δtilt values in Example 2, Example 3, and Comparative Example 1.
Figure 13:
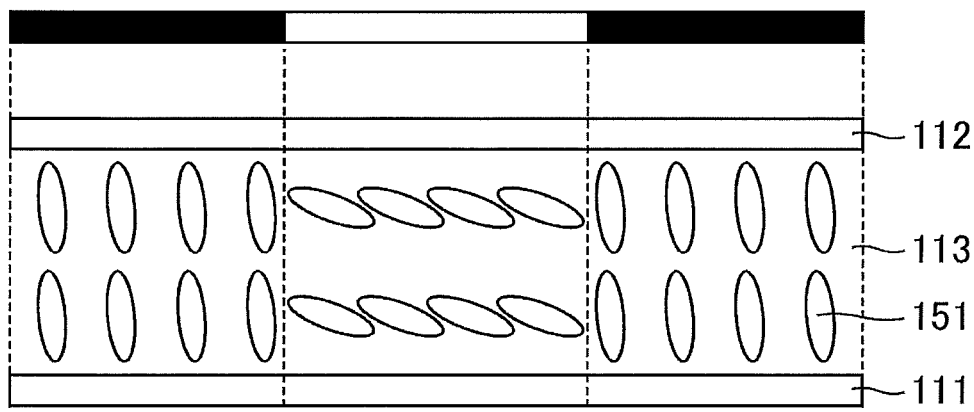
FIG. 13 is a conceptual image illustrating the principle of image sticking caused by insufficient returning of the tilt of liquid crystal molecules under application of a voltage.
Figure 14:
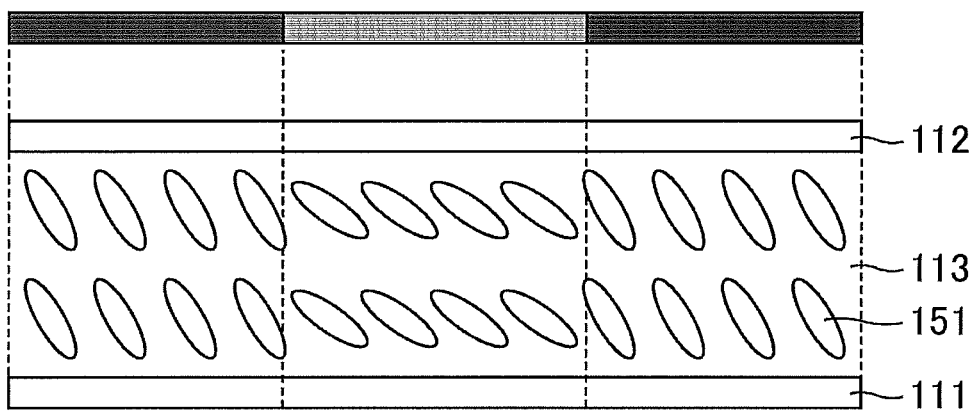
FIG. 14 is a conceptual image illustrating the principle of image sticking caused by insufficient returning of the tilt of liquid crystal molecules when the voltage is changed to a voltage for halftone display after application of a voltage for a certain period of time.

FIG. 12 is a graph showing the measured Δtilt values in Example 2, Example 3, and Comparative Example 1. In FIG. 12, the D graphs (two samples of d1 and d2) show the results of Comparative Example 1, the E graphs (two samples of e1 and e2) show the results of Example 2, and the F graph (one sample of f1) shows the result of Example 3.

The Δtilt value was obtained as follows: an AC voltage of 7.5 V and 30 Hz was continuously applied to the liquid crystal display panel for 40 hours, and the tilt angle was measured every one hour while the voltage application was temporarily stopped. The amount of change in the tilt angle between each measured tilt angle and the tilt angle under no voltage application was calculated. An average value of the calculated amounts of change in a period of 36 to 40 hours from the start of the voltage application was obtained as the Δtilt value.

Comparison of the D graphs with the E graphs and F graph in FIG. 12 proves that the liquid crystal display panels prepared through the PSA polymerization step using visible light had a smaller Δtilt value, even if all the panels were of VATN mode. Namely, the Δtilt value was greatly reduced when the PSA polymerization step was performed under the conditions in Example 2 or Example 3. Specifically, every value in the E graphs and the F graph was reduced to about ¼ of the values in the D graphs. This is considered due to the use of visible light in the PSA polymerization treatment, and the use of the monomer materials in the abovementioned combination. As mentioned above, the Δtilt value was greatly reduced so that the occurrence of image sticking was reduced in Example 2 and Example 3.

Embodiment 1 and the specific examples (Examples 1 to 3) thereof were explained above, and the summary was as follows. In Embodiment 1, a polymerizable monomer for PSA and a benzyl monomer having an initiator function which serves as a polymerization initiator were mixed, before a PSA polymerization step, in a liquid crystal layer included in a liquid crystal display panel of the liquid crystal television set according to the present invention. The monomer having an initiator function is reactive to light having a wavelength of 380 nm or longer (visible light) that is not cut by a polarizing plate, and thus the polymerization of the monomer for PSA can be caused by visible light. Meanwhile, a photo-alignment film is initially formed on at either or both of a pair of substrates on a surface contacting a liquid crystal layer that is disposed between the substrates, which allows the liquid crystal molecules to align in a slightly tilting manner (i.e. have a tilt angle) even under no voltage application. Furthermore, two polarizing plates are respectively applied to the pair of substrates, each polarizing plate being attached on outside (the side opposite to the liquid crystal layer) the substrate. In Embodiment 1, the liquid crystal display panel having the aforementioned constitution was exposed to light from a backlight while no voltage was applied thereto, and thereby the polymerization of the polymerizable monomer was performed by the light. Accordingly, the tilt angle of the liquid crystal molecules was fixed.

The aforementioned arrangement enables to prevent a phenomenon of insufficient returning of the tilt of the liquid crystal molecules upon changing images, which in turn solves the problem of image sticking. The first advantageous effect of the present invention is significant reduction in the occurrence of image sticking, which is one of the major problems for liquid crystal display devices, by preventing the Δtilt. The second advantageous effect of the present invention is prevention of deterioration in the electric properties of the liquid crystal display panel. This effect is achieved by the use of visible light for the polymerization of a polymerizable monomer, which causes no damages to the liquid crystal material or alignment film. The third advantageous effect of the present invention is the requirement of no additional equipment investment to achieve the present invention. According to the present invention, it is possible to subject a liquid crystal display panel to which polarizing plates are attached, to PSA treatment with exposure to light from a conventional backlight. If the polymerizable monomer (phenanthrene monomer or biphenyl monomer) is not reactive to visible light, the concurrent use of a benzyl monomer having an initiator function that absorbs visible light enables to initiate the polymerization of the other polymerizable monomers. Thus, the PSA treatment can be carried out merely by placing a liquid crystal display panel in a backlight unit and exposing the liquid crystal display panel to light from a backlight. Hence, additional devices or steps special to the PSA treatment are not necessary.

In the aforementioned Embodiment 1 and specific examples thereof (Examples 1 to 3), a liquid crystal composition containing a polymerizable monomer for PSA and a benzyl monomer having an initiator function which serves as a polymerization initiator is used. In the case of using, as another example of the configuration, a liquid crystal composition containing a polymerizable monomer for PSA and a polymerization initiator which causes a chemical reaction upon exposure to visible light, substantially the same image sticking-reducing effect can be achieved. Moreover, deterioration in the electric properties can be prevented. Additionally, as no additional equipment investment is necessary, the manufacturing cost can be greatly reduced. However, a polymerization initiator may remain in the liquid crystal layer after polymerization of the monomers. In view of this, the configurations of the aforementioned Embodiment 1 and specific example thereof (Examples 1 to 3) are more preferable for further enhancement of the electric property of the liquid crystal display panel.

Application of VAIN mode to a liquid crystal display panel is mentioned as an example in the aforementioned Embodiment 1 and specific examples thereof (Examples 1 to 3). Furthermore, if the PSA treatment method of the present invention is applied to, for example, MVA mode in which structures for alignment control such as dielectric protrusions and slits are formed, or VA mode in which fishbone-shaped slits are formed, the advantageous effects of improving the image sticking, electric properties and manufacturing cost can be achieved as in the case of VATN mode. In the aforementioned cases, an alignment treatment on the alignment film is not necessary. However, some arrangements may be required; for example, the PSA polymerization step may be performed under application of a threshold or higher voltage. The use of visible light in the PSA treatment, which is the significant feature of the present invention, enables to reduce the Δtilt in another mode. Moreover, as visible light is used, the components of the liquid crystal display panel, such as a liquid crystal and an alignment film, are not degraded, thereby preventing deterioration in the electric properties. Furthermore, as the PSA treatment can be performed by using visible light from a backlight, no additional equipment investment is necessary for the PSA treatment.

The present application claims priority to Patent Application No. 2011-156048 filed in Japan on Jul. 14, 2011 under the Paris Convention and provisions of national law in a designated State, the entire contents of which are hereby incorporated by reference.

REFERENCE SIGNS LIST

1: Liquid crystal display panel
2: Backlight
3: Base
10: Liquid crystal television set
11, 111: Thin film transistor (TFT) substrate
12, 112: Color filter (CF) substrate
13, 113: Liquid crystal layer
14: Monomer
21, 31: Transparent substrate
22, 32: Alignment film
23, 33: PSA layer (polymer layer)
51, 151: Liquid crystal molecule

The invention claimed is:
1. A liquid crystal display device, comprising
a pair of substrates,
a liquid crystal layer disposed between the pair of substrates,
an alignment film arranged on at least one of the pair of substrates, and
a polymer layer arranged on the alignment film and controlling the alignment of liquid crystal molecules which are adjacent to the polymer layer,
wherein the polymer layer is formed by polymerization of two or more kinds of monomers added in the liquid crystal layer, and at least one of the two or more kinds of monomers is a first monomer, the first monomer being polymerizable upon exposure to visible light and represented by the following chemical formula (1):

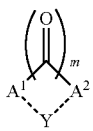
(1)

wherein $A^1$ and $A^2$ are each independently a benzene ring, a biphenyl ring, or a C1-C12 linear or branched alkyl or alkenyl group;

at least one of $A^1$ and $A^2$ includes a -$Sp^1$-$P^1$ group;

a hydrogen atom in $A^1$ and $A^2$ may be substituted with a -$Sp^1$-$P^1$ group, a halogen atom, a —CN group, a —$NO_2$ group, a —NCO group, a —NCS group, a —OCN group, a —SCN group, a —$SF_5$ group, or a C1-C12 alkyl, alkenyl, or aralkyl group, the alkyl or alkenyl group being linear or branched;

two adjacent hydrogen atoms in $A^1$ or $A^2$ may be substituted with a C1-C12 linear or branched alkylene or alkenylene group to form a ring structure;

a hydrogen atom in the alkyl, alkenyl, alkylene, alkenylene, or aralkyl group of $A^1$ and $A^2$ may be substituted with a -$Sp^1$-$P^1$ group;

a —$CH_2$— group in the alkyl, alkenyl, alkylene, alkenylene, or aralkyl group of $A^1$ and $A^2$ may be substituted with an —O— group, a —S— group, a —NH— group, a —CO— group, a —COO— group, a —OCO— group, a —O—COO— group, a —$OCH_2$— group, a —$CH_2O$— group, a —$SCH_2$— group, a —$CH_2S$— group, a —$N(CH_3)$— group, a —$N(C_2H_5)$— group, a —$N(C_3H_7)$— group, a —$N(C_4H_9)$— group, a —$CF_2O$— group, a —$OCF_2$— group, a —$CF_2S$— group, a —$SCF_2$— group, a —$N(CF_3)$— group, a —$CH_2CH_2$— group, a —$CF_2CH_2$— group, a —$CH_2CF_2$— group, a —$CF_2CF_2$— group, a —CH=CH— group, a —CF=CF— group, a —C≡C— group, a —CH=CH—COO— group, or a —OCO—CH=CH— group, provided that oxygen atoms, sulfur atoms and nitrogen atoms are mutually apart;

$P^1$ is a polymerizable group;

$Sp^1$ is a $C_1$-$C_6$ linear, branched, or cyclic alkylene or alkyleneoxy group, or a direct bond;

m is 1 or 2;

a dotted line connecting $A^1$ and Y, and a dotted line connecting $A^2$ and Y show an optional bond between $A^1$ and $A^2$ mediated by Y; and Y is a —$CH_2$— group, a —$CH_2CH_2$— group, a —CH=CH— group, a —O— group, a —S— group, a —NH— group, a —$N(CH_3)$— group, a —$N(C_2H_5)$— group, a —$N(C_3H_7)$— group, a —$N(C_4H_9)$— group, a —$OCH_2$— group, a —$CH_2O$— group, a —$SCH_2$— group, a —$CH_2S$— group, or a direct bond.

2. The liquid crystal display device according to claim 1, wherein the first monomer is any of compounds represented by the following chemical formulae (2-1) to (2-8):

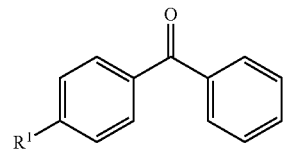
(2-1)

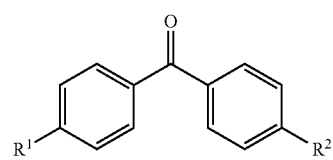
(2-2)

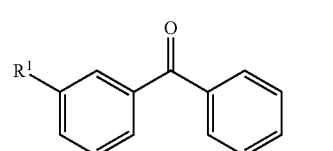
(2-3)

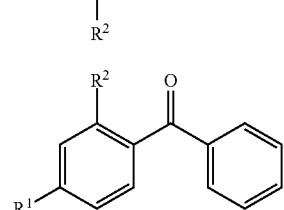
(2-4)

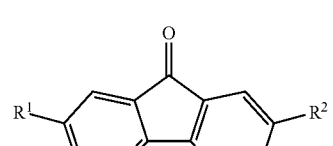
(2-5)

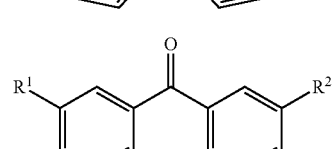
(2-6)

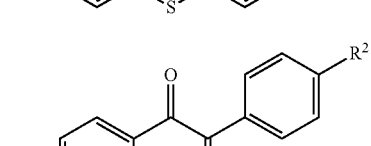
(2-7)

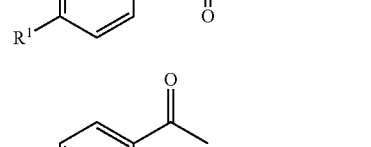
(2-8)

wherein $R^1$ and $R^2$ are each independently a -$Sp^1$-$P^1$ group, a hydrogen atom, a halogen atom, a —CN group, a —$NO_2$ group, a —NCO group, a —NCS group, a —OCN group, a —SCN group, a —$SF_5$ group, a phenyl group, or a $C_1$-$C_{12}$ alkyl or aralkyl group, the alkyl group being linear or branched;

at least one of $R^1$ and $R^2$ includes a -$Sp^1$-$P^1$ group;

$P^1$ is a polymerizable group;

$Sp^1$ is a $C_1$-$C_6$ linear, branched, or cyclic alkylene or alkyleneoxy group, or a direct bond;

a hydrogen atom in at least one of $R^1$ and $R^2$, when the at least one of $R^1$ and $R^2$ is a phenyl group or a $C_1$-$C_{12}$ alkyl or aralkyl group, may be substituted with a fluorine atom, a chlorine atom, or a -$Sp^1$-$P^1$ group;

a —$CH_2$— group in $R^1$ and $R^2$ may be substituted with an —O— group, a —S— group, a —NH— group, a —CO— group, a —COO— group, a —OCO— group, a —O—COO— group, a —OCH$_2$— group, a —CH$_2$O— group, a —SCH$_2$— group, a —CH$_2$S— group, a —N(CH$_3$)— group, a —N(C$_2$H$_5$)— group, a —N(C$_3$H$_7$)— group, a —N(C$_4$H$_9$)— group, a —CF$_2$O— group, a —OCF$_2$— group, a —CF$_2$S— group, a —SCF$_2$— group, a —N(CF$_3$)— group, a —CH$_2$CH$_2$— group, a —CF$_2$CH$_2$— group, a —CH$_2$CF$_2$— group, a —CF$_2$CF$_2$— group, a —CH=CH— group, a —CF=CF— group, a —C≡C— group, a —CH=CH—COO— group, or a —OCO—CH=CH— group, provided that oxygen atoms, sulfur atoms and nitrogen atoms are mutually apart; and the $P^1$ include an acryloyloxy group, a methacryloyloxy group, a vinyl group, a vinyloxy group, an acryloylamino group, or a methacryloylamino group.

3. The liquid crystal display device according to claim 1, wherein the first monomer is any of compounds represented by the following chemical formulae (2-6) and (2-7):

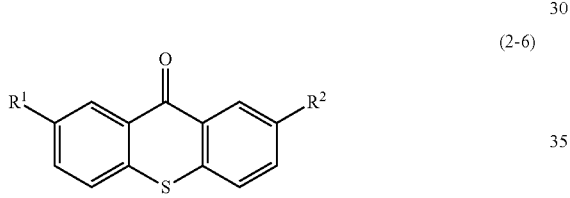

(2-6)

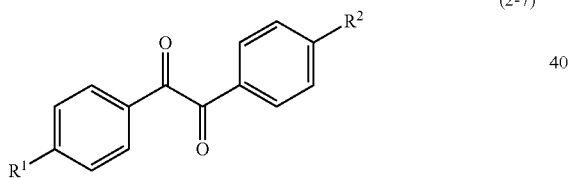

(2-7)

wherein $R^1$ and $R^2$ are each independently a -$Sp^1$-$P^1$ group, a hydrogen atom, a halogen atom, a —CN group, a —NO$_2$ group, a —NCO group, a —NCS group, a —OCN group, a —SCN group, a —SF$_5$ group, a phenyl group, or a $C_1$-$C_{12}$ alkyl or aralkyl group, the alkyl group being linear or branched;

at least one of $R^1$ and $R^2$ includes a -$Sp^1$-$P^1$ group;

$P^1$ is a polymerizable group;

$Sp^1$ is a $C_1$-$C_6$ linear, branched, or cyclic alkylene or alkyleneoxy group, or a direct bond;

a hydrogen atom in at least one of $R^1$ and $R^2$, when the at least one of $R^1$ and $R^2$ is a phenyl group or a $C_1$-$C_{12}$ alkyl or aralkyl group, may be substituted with a fluorine atom, a chlorine atom, or a -$Sp^1$-$P^1$ group;

a —$CH_2$— group in $R^1$ and $R^2$ may be substituted with an —O— group, a —S— group, a —NH— group, a —CO— group, a —COO— group, a —OCO— group, a —O—COO— group, a —OCH$_2$— group, a —CH$_2$O— group, a —SCH$_2$— group, a —CH$_2$S— group, a —N(CH$_3$)— group, a —N(C$_2$H$_5$)— group, a —N(C$_3$H$_7$)— group, a —N(C$_4$H$_9$)— group, a —CF$_2$O— group, a —OCF$_2$— group, a —CF$_2$S— group, a —SCF$_2$— group, a —N(CF$_3$)— group, a —CH$_2$CH$_2$— group, a —CF$_2$CH$_2$— group, a —CH$_2$CF$_2$— group, a —CF$_2$CF$_2$— group, a —CH=CH— group, a —CF=CF— group, a —C≡C— group, a —CH=CH—COO— group, or a —OCO—CH=CH— group, provided that oxygen atoms, sulfur atoms and nitrogen atoms are mutually apart; and the $P^1$ include an acryloyloxy group, a methacryloyloxy group, a vinyl group, a vinyloxy group, an acryloylamino group, or a methacryloylamino group.

4. The liquid crystal display device according to claim 1, wherein the first monomer is a compound represented by the following chemical formula (2-7):

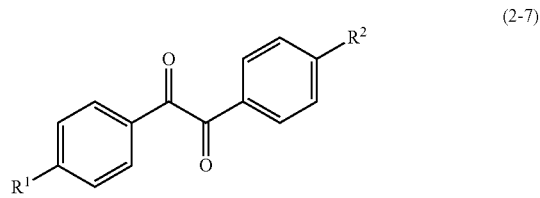

(2-7)

wherein $R^1$ and $R^2$ are each independently a -$Sp^1$-$P^1$ group, a hydrogen atom, a halogen atom, a —CN group, a —NO$_2$ group, a —NCO group, a —NCS group, a —OCN group, a —SCN group, a —SF$_5$ group, a phenyl group, or a $C_1$-$C_{12}$ alkyl or aralkyl group, the alkyl group being linear or branched;

at least one of $R^1$ and $R^2$ includes a -$Sp^1$-$P^1$ group;

$P^1$ is a polymerizable group;

$Sp^1$ is a $C_1$-$C_6$ linear, branched, or cyclic alkylene or alkyleneoxy group, or a direct bond;

a hydrogen atom in at least one of $R^1$ and $R^2$, when the at least one of $R^1$ and $R^2$ is a phenyl group or a $C_1$-$C_{12}$ alkyl or aralkyl group, may be substituted with a fluorine atom, a chlorine atom, or a -$Sp^1$-$P^1$ group;

a —$CH_2$— group in $R^1$ and $R^2$ may be substituted with an —O— group, a —S— group, a —NH— group, a —CO— group, a —COO— group, a —OCO— group, a —O—COO— group, a —OCH$_2$— group, a —CH$_2$O— group, a —SCH$_2$— group, a —CH$_2$S— group, a —N(CH$_3$)— group, a —N(C$_2$H$_5$)— group, a —N(C$_3$H$_7$)— group, a —N(C$_4$H$_9$)— group, a —CF$_2$O— group, a —OCF$_2$— group, a —CF$_2$S— group, a —SCF$_2$— group, a —N(CF$_3$)— group, a —CH$_2$CH$_2$— group, a —CF$_2$CH$_2$— group, a —CH$_2$CF$_2$— group, a —CF$_2$CF$_2$— group, a —CH=CH— group, a —CF=CF— group, a —C≡C— group, a —CH=CH—COO— group, or a —OCO—CH=CH— group, provided that oxygen atoms, sulfur atoms and nitrogen atoms are mutually apart; and the $P^1$ include an acryloyloxy group, a methacryloyloxy group, a vinyl group, a vinyloxy group, an acryloylamino group, or a methacryloylamino group.

5. The liquid crystal display device according to claim 1, wherein at least one of the other kinds of monomers which are different from the first monomer of the two or more kinds of monomers is a first compound represented by the following chemical formula (3):

$$P^2-S_p^2-R^4-A^3-(Z-A^4)_n-R^3 \qquad (3)$$

wherein R³ is a —R⁴—Sp²-P² group, a hydrogen atom, a halogen atom, a —CN group, a —NO₂ group, a —NCO group, a —NCS group, an —OCN group, a —SCN group, a —SF₅ group, or a C₁-C₁₂ linear or branched alkyl group;

P² is a polymerizable group;

Sp² is a C₁-C₆ linear, branched, or cyclic alkylene or alkyleneoxy group, or a direct bond;

a hydrogen atom in R³ may be substituted with a fluorine atom or a chlorine atom;

a —CH₂— group in R³ may be substituted with an —O— group, a —S— group, a —NH— group, a —CO— group, a —COO— group, a —OCO— group, a —O—COO— group, a —OCH₂— group, a —CH₂O— group, a —SCH₂— group, a —CH₂S— group, a —N(CH₃)— group, a —N(C₂H₅)— group, a —N(C₃H₂)— group, a —N(C₄H₉)— group, a —CF₂O— group, a —OCF₂— group, a —CF₂S— group, a —SCF₂— group, a —N(CF₃)— group, a —CH₂CH₂— group, a —CF₂CH₂— group, a —CH₂CF₂— group, a —CF₂CF₂— group, a —CH=CH— group, a —CF=CF— group, a —C≡C— group, a —CH=CH—COO— group, or a —OCO—CH=CH— group, provided that oxygen atoms, and sulfur atoms are mutually apart;

R⁴ is a —O— group, a —S— group, a —NH— group, a —CO— group, a —COO— group, a —OCO— group, a —O—COO— group, a —OCH₂— group, a —CH₂O— group, a —SCH₂— group, a —CH₂S— group, a —N(CH₃)— group, a —N(C₂H₅)— group, a —N(C₃H₇)— group, a —N(C₄H₉)— group, a —CF₂O— group, a —OCF₂— group, a —CF₂S— group, a —SCF₂— group, a —N(CF₃)— group, a —CH₂CH₂— group, a —CF₂CH₂— group, a —CH₂CF₂— group, a —CF₂CF₂— group, a —CH=CH— group, a —CF=CF— group, a —C≡C— group, a —CH=CH—COO— group, a —OCO—CH=CH— group, or a direct bond;

A³ and A⁴ are each independently a 1,2-phenylene group, a 1,3-phenylene group, a 1,4-phenylene group, a naphthalene-1,4-diyl group, a naphthalene-1,5-diyl group, a naphthalene-2,6-diyl group, a 1,4-cyclohexylene group, a 1,4-cyclohexenylene group, a 1,4-bicyclo[2.2.2]octylene group, a piperidine-1,4-diyl group, a naphthalene-2,6-diyl group, a decahydronaphthalene-2,6-diyl group, a 1,2,3,4-tetrahydronaphthalene-2,6-diyl group, an indane-1,3-diyl group, an indane-1,5-diyl group, an indane-2,5-diyl group, a phenanthrene-1,6-diylgroup, a phenanthrene-1,8-diyl group, a phenanthrene-2,7-diyl group, a phenanthrene-3,6-diylgroup, an anthracene-1,5-diyl group, an anthracene-1,8-diyl group, an anthracene-2,6-diyl group, or an anthracene-2,7-diyl group;

—CH₂— groups in A³ and A⁴ may be substituted with —O— groups or —S— groups, provided that they are mutually apart;

a hydrogen atom in A³ and A⁴ may be substituted with a fluorine atom, a chlorine atom, a —CN group, or a C₁-C₆ alkyl, alkoxy, alkylcarbonyl, alkoxycarbonyl, or alkylcarbonyloxy group;

Z is independently a —O— group, a —S— group, a —NH— group, a —CO— group, a —COO— group, a —OCO— group, a —O—COO— group, a —OCH₂— group, a —CH₂O— group, a —SCH₂— group, a —CH₂S— group, a —N(CH₃)— group, a —N(C₂H₅)— group, a —N(C₃H₇)— group, a —N(C₄H₉)— group, a —CF₂O— group, a —OCF₂— group, a —CF₂S— group, a —SCF₂— group, a —N(CF₃)— group, a —CH₂CH₂— group, a —CF₂CH₂— group, a —CH₂CF₂— group, a —CF₂CF₂— group, a —CH=CH— group, a —CF=CF— group, a —C≡C— group, a —CH=CH—COO— group, a —OCO—CH=CH— group, or a direct bond; and n is 0, 1, or 2.

6. The liquid crystal display device according to claim 5, wherein the first compound is any of compounds represented by the following chemical formulae (4-1) to (4-5):

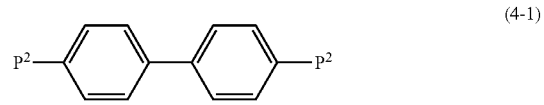

(4-1)

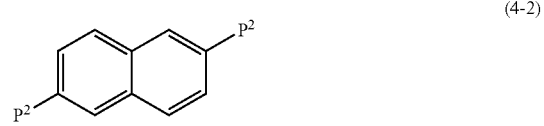

(4-2)

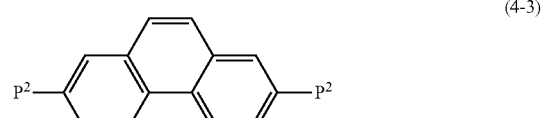

(4-3)

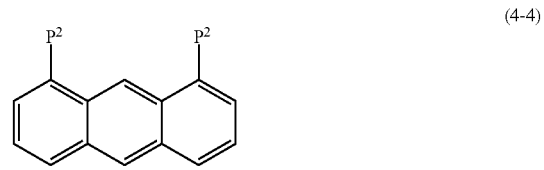

(4-4)

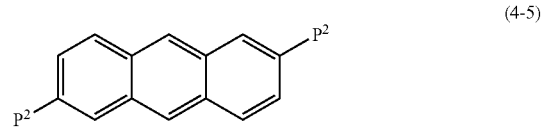

(4-5)

wherein P²s are each independently a polymerizable group; and the P² include an acryloyloxy group, a methacryloyloxy group, a vinyl group, a vinyloxy group, an acryloylamino group, or a methacryloylamino group.

7. The liquid crystal display device according to claim 5, wherein the first compound is any of compounds represented by the following chemical formulae (4-1) and (4-3):

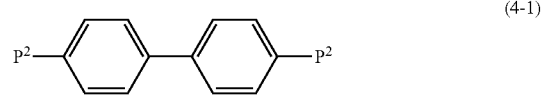

(4-1)

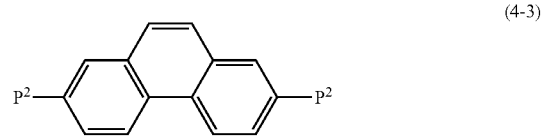

(4-3)

wherein P²s are each independently a polymerizable group; and the P² include an acryloyloxy group, a methacryloyloxy group, a vinyl group, a vinyloxy group, an acryloylamino group, or a methacryloylamino group.

8. The liquid crystal display device according to claim 1, further comprising
a backlight which irradiates the visible light.

9. The liquid crystal display device according to claim 1, wherein the alignment film is an alignment film provided with an alignment-control function by a photo-alignment treatment.

10. The liquid crystal display device according to claim 9, wherein the alignment film provided with an alignment-control function by a photo-alignment treatment contains a photo-reactive functional group, and
the photo-reactive functional group is a chalkone group, a coumarin group, a cinnamate group, an azobenzene group, or a stilbene group.

11. The liquid crystal display device according to claim 9, wherein the alignment film provided with an alignment-control function by a photo-alignment treatment is based on a polyimide, a polyamic acid, a polymaleimide, or a polysiloxane.

* * * * *